(12) United States Patent
Goldbach et al.

(10) Patent No.: US 7,781,529 B2
(45) Date of Patent: *Aug. 24, 2010

(54) BLEND OF IONIC (CO)POLYMER RESINS AND MATRIX (CO)POLYMERS

(75) Inventors: James T. Goldbach, Paoli, PA (US); David A. Mountz, Exton, PA (US)

(73) Assignee: Arkema Inc., Philadelphia, PA (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/141,376

(22) Filed: Jun. 18, 2008

(65) Prior Publication Data

US 2008/0242805 A1    Oct. 2, 2008

Related U.S. Application Data

(62) Division of application No. 11/409,648, filed on Apr. 24, 2006, now Pat. No. 7,396,880.

(60) Provisional application No. 60/684,038, filed on May 24, 2005.

(51) Int. Cl.
   *C08L 25/02* (2006.01)
   *C08L 27/02* (2006.01)
   *C08F 214/26* (2006.01)

(52) U.S. Cl. .................. 525/199; 525/200; 525/241

(58) Field of Classification Search .................. 525/199, 525/200, 241
See application file for complete search history.

(56) References Cited

U.S. PATENT DOCUMENTS

| 4,526,951 | A | 7/1985 | Lundberg et al. |
| 6,872,781 | B2 | 3/2005 | Hedhli et al. |
| 7,629,426 | B2 * | 12/2009 | Goldbach ............ 526/274 |
| 2004/0175498 | A1 | 9/2004 | Hedhli et al. |
| 2004/0175625 | A1 | 9/2004 | Hedhli et al. |
| 2005/0077233 | A1 | 4/2005 | Hedhli et al. |
| 2006/0014067 | A1 | 1/2006 | Hedhli et al. |

FOREIGN PATENT DOCUMENTS

WO    WO 9967304    12/1999

* cited by examiner

*Primary Examiner*—Nathan M Nutter
(74) *Attorney, Agent, or Firm*—Thomas F. Roland

(57) ABSTRACT

The invention relates to polymeric resin blends containing polyelectrolyte resins blended into a polymer or copolymer matrix. Specifically, the polyelectrolyte resins are (co)polymers without hydrolyzable groups. The matrix polymer is a tough, and highly chemical-resistant (co)polymer, preferably a fluoropolymer. The polymeric resin blend is useful for forming films, and especially films useful for MEAs for use in fuel cells.

11 Claims, 1 Drawing Sheet

BLEND OF IONIC (CO)POLYMER RESINS AND MATRIX (CO)POLYMERS

This application is a divisional application of U.S. patent application Ser. No. 11/409,648 and claims priority benefit under 35 U.S.C. §119(e) of U.S. provisional application 60/684,038, filed May 24, 2005, and also claims benefit under 35 U.S.C. §121 of U.S. patent application Ser. No. 11/409,648, filed Apr. 24, 2006.

FIELD OF THE INVENTION

The invention relates to polymeric blends containing polyelectrolyte resins blended into a polymer or copolymer matrix. Specifically, the polyelectrolyte resins are (co)polymers without hydrolyzable groups. The matrix polymer is a tough, and highly chemical-resistant (co)polymer, preferably a fluoropolymer. The polymeric resin blend is useful for forming films, and especially films useful for MEAs for use in fuel cells.

BACKGROUND OF THE INVENTION

Perfluorocarbon ionic exchange membranes provide high cation transport, and have been extensively used as ionic exchange membranes. Polymeric ion exchange membranes can be referred to as solid polymer electrolytes or polymer exchange membranes (PEM). Because of the severe requirements for fuel cell applications, the most commonly used membranes, and commercially available, are made from perfluorosulfonated Nafion®, Flemion® and Aciplex® polymers. However, reports and literature describe these membranes as working well but show several limitations that prevent developing the technology further to commercialization. Additionally, they work better with gaseous fuels than with liquid fuels which may be mainly due to liquid fuel crossover that diminishes cell performance. A membrane's chemical resistance and mechanical strength are important properties for fuel cell applications. Indeed, the membrane is often subjected to high differential pressure, hydration-dehydration cycles, as well as other stressful conditions. Also, mechanical strength becomes important when the membrane is very thin such as less than 50 microns. Further, when used with fuel cells or battery applications, the membrane sits in a very acidic medium at temperatures that can reach 200° C., in an oxidizing and/or reducing environment due to the presence of metal ions and sometimes the presence of solvents. This environment requires that the membrane be chemically and electrochemically resistant, as well as thermally stable.

Currently, many fluorine-containing membranes can suffer from one or more of the following short comings:

i) high liquid and gas crossover through the membrane;
ii) heterogeneous blending between the fluorinated polymer and other polymers that leads to inferior properties;
iii) insufficient chemical resistance in the presence of some liquid fuels;
iv) poor electrochemical resistance;
v) lack of homogeneous distribution of sulfonated groups;
vi) poor mechanical properties; and/or poor thermal stability.

Polyelectrolyte polymer blends having small domain sizes, and a process for producing such are described in US 2005077233. The polyelectrolyte polymer is a non-perfluorinated polymeric resin containing ionic and/or ionizable groups and in particular sulfonate or phosphonate groups, with a fluoropolymer matrix. One problem with the disclosed polyelectrolytes is that those containing hydrolytically unstable groups, such as esters and acrylamides, tend to hydrolyze in harsh chemical environments leading to a loss of the ionizable functionality.

WO 99/67304 describes a new class of unsaturated compounds having a fluoroether-substituted aromatic ring, and polymers formed from these compounds. One use for the polymers is as separators in electrochemical cells.

There is a need for a membrane that overcomes the limitations for use in fuel cell applications.

Surprisingly, it was found that polymer blends containing a fluoropolymer and a polyelectrolyte having no hydrolyzable groups can be used to form membranes for electrochemical cells having a high level of chemical resistance and mechanical strength.

SUMMARY OF THE INVENTION

It is an objective of the invention to provide polyelectrolytes having excellent proton conductivity, and chemical resistance.

It is a further objective of the invention to provide a membrane or film wherein the polyelectrolyte is evenly distributed in a matrix polymer, such as a fluoropolymer, and where the domain size is very small.

It is a further objective to provide a well-defined polyelectrolyte that is hydrolytically stable (non-hydrolyzable), involves relatively low-cost starting materials, and can be formed with a minimal number of transformations.

The objectives of the invention are achieved, in accordance with the principles of a preferred embodiment of the invention, by a polymer blend containing a fluoropolymer and a polyelectrolyte having no hydrolyzable groups. The domain size of the vinyl resin in the fluoropolymer matrix is preferably 500 nm or less.

DETAILED DESCRIPTION OF THE INVENTION

Figure 1:
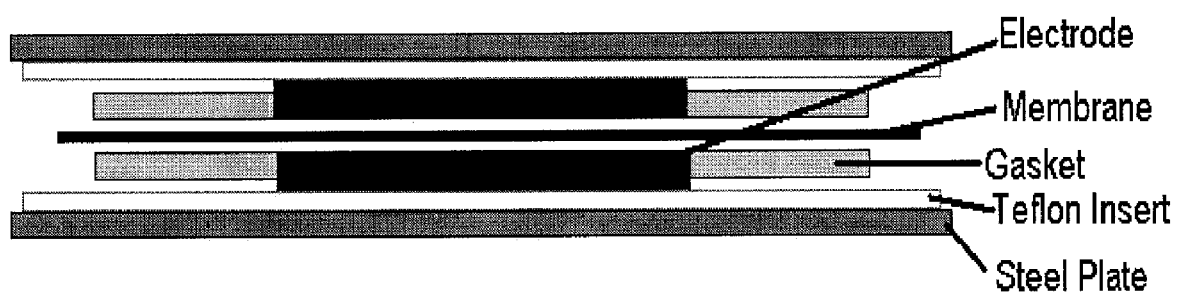
FIG. 1: Depicts a typical Membrane-Electrode Assembly, as described in Example 54.

The terms polymer and (co)polymer, as used herein refer to polymers formed from one or more monomers. This includes homopolymers, copolymers, terpolymers and polymers formed from four or more monomers. Copolymer refers to both random and block copolymers, as well as graft copolymers. Copolymer is also used to describe a polymer resembling a copolymer which is formed by the partial reaction/substitution of some of the side groups of a homopolymer, resulting in a polymer backbone having two or more different moieties as side chains.

The invention relates to polymeric resin blends containing polyelectrolyte resins blended into a polymer or copolymer matrix. Specifically, the polyelectrolyte resins are (co)polymers without hydrolyzable groups. The matrix polymer is a tough, and highly chemical-resistant (co)polymer, preferably a fluoropolymer.

The matrix polymer can be any of the polymers and copolymers described as the matrix in US2005077233, incorporated herein by reference. Preferably, the polymer matrix contains at least one fluoropolymer. The fluoropolymer can be a homopolymer or other type of polymer, and can be a mixture of fluoropolymers or a mixture of fluoropolymer with a non-fluoropolymer. Preferably, the fluoropolymer is a thermoplastic fluoropolymer and can form a polymer blend with the other components of a formulation, including other polymers present. Preferably, the fluoropolymer is a poly(vinylidene fluoride) polymer such as a poly(vinylidene fluoride) homopolymer. Other examples of fluoropolymers include, but are not limited to, a poly(alkylene) containing at least one fluorine atom, such as polyhexafluoropropylene, polytetrafluoroethylene, poly(vinyl fluoride), or combinations thereof. More preferably, the fluoropolymer is a polymeric composition containing from about 30% to about 100 weight % of vinylidene fluoride and from 0% to about 70 weight % of at least one poly(alkylene) containing at least one fluorine atom, such as, hexafluoropropylene, tetrafluoroethylene, trifluoroethylene (VF3), chlorotrifluoroethylene, and/or vinyl fluoride. Preferably, the molecular weight of the fluoropolymer which can include homopolymers, copolymers, terpolymers, oligomers, and other types of polymers is from about 80,000 MW to about 1,000,000 MW and, more preferably from about 100,000 MW to about 500,000 MW. The fluoropolymers can be prepared using the techniques described in U.S. Pat. Nos. 3,051,677; 3,178,399; 3,475,396; 3,857,827; and 5,093,427, all incorporated herein in their entirety by reference.

The matrix polymer is blended with one or more polyelectrolye (co)polymers. The polyelectrolyte copolymer contains ionic or ionizable groups, as well as groups capable of crosslinking. The ionizable groups are preferably sulfonate, phosphonate or carboxylate groups. The level of ionic or ionizable groups should be high, preferably from 25 to 99 weight percent, more preferably from 50 to 95 weight percent, and most preferably from 70 to 95 weight percent in the polyelectrolyte. The ionic or ionizable groups may be present on the monomer used to form the polyelectrolyte, or may be added to the polyelectrolyte in a post-polymerization reaction.

The level of cross-linking moieties is from 1-75 weight percent, preferably 1-50 weight percent, more preferably from 10-30 weight percent, and most preferably from 10-20 weight percent, based on the weight of the copolymer. Cross-linking can be done via conventional methods including, but not limited to, self-condensation, addition of a secondary cross-linking agent, or radiation crosslinking. These are well described in the literature and well known in the art. Examples of monomers able to undergo self condensation crosslinking include, but are not limited to: primary, secondary, and tertiary amines; N-methylol acrylamide; isobutoxy methacrylamide; N-methylenebisacrylamide; allyl groups; styryl groups; and glycidyl methacrylate. Examples of secondary cross-linkers include free and blocked isocyanates, melamines, epoxies, carboxylates, α,ω-dihaloalkanes, α,ω-dialdehydes, carboxylic acids, alkoxy silanes, silicones, aziridines, and carbodiimides. Catalysts which can be chosen for the specific crosslinking chemistry and would include organotins, sulfonic acids, or amines. Examples of radiation cross-linking include electron beam, ultraviolet, and gamma radiation.

The polyelectrolyte may be non-perfluorinated, partially-perfluorinated or entirely perfluorinated (co)polymers. The level of perfluorination can have dramatic effects on the ionic conductivity, mechanical strength, and permeability of the resultant (co)polymer blend(s).

Polyelectrolytes useful in the present invention are those containing non-hydrolyzable groups. It has been found that monomers having readily hydrolyzable groups, such as esters (for example acrylates and methacrylates) and acrylamides, will hydrolyze in harsh chemical environments (such as in battery acid), and lose the ability to easily ionize.

Preferred polyelectrolytes are those having a styrenic or vinyl ether structure.

The polyelectrolyte can be formed by emulsion, suspension, inverse emulsion, or solution polymerization. It may also be formed by a post-polymerization modification.

The polyelectrolytes of the invention and manner of making the polyelectrolytes will now be illustrated, both generally and specifically, with reference to specific embodiments thereof, namely vinyl ether-type polyelectrolytes, and styrenic-type polyelectrolytes. Also, specific and general embodiments will be illustrated showing both traditional copolymerization involving two separate monomers, and the formation of a copolymer based on partial reaction(s) of a homopolymers to form two or more separate functional monomer units.

Vinyl Ether-type Structures

The general structure of vinyl-ether-type polyelectrolyte structures of the present invention is:

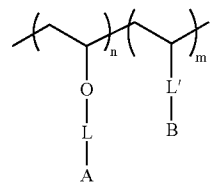

Where:
L=non-perfluorinated alkyl or alkylene-etheralkylene-ether linkage (DOUBLE listed)
L'=a bond or alkyl or alkylene-etheralkylene-ether linkage (DOUBLE listed)
n=25-99 mol %, preferably greater than 50%, most preferably greater than 70%
m=1-75 mol %, preferably less than 50%, most preferably less than 30%
A=a sulfonate, phosphonate or carboxylate
B=a group capable of cross-linking A general synthetic route to said copolymers is:

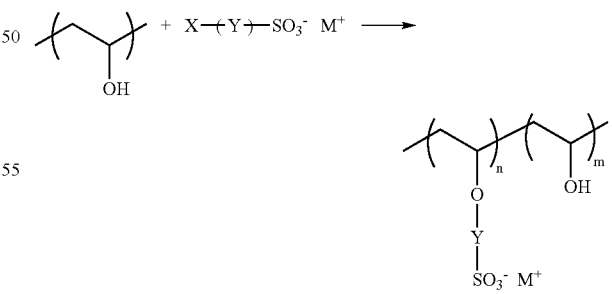

X=Cl, Br, or I
Y=aliphatic (—$CH_2$—) of $C_2$ to $C_{12}$, or aromatic-containing (eg.: —$CH_2$-Ph-$CH_2$—)
M=Alkali earth metal (Li, Na, K, Rb, Cs)
n:m=preferably, 80:20 or 90:10 mol/mol An alternate general synthetic route to said copolymers is:

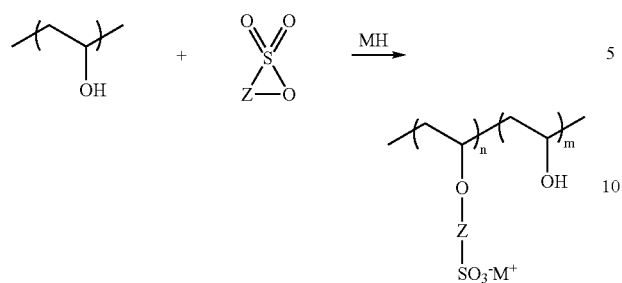

Z=aliphatic or perfluoroaliphatic of $C_2$ to $C_5$, or aromatic or perfluoroaromatic MH=Metal hydride (eg. NaH)

n:m=preferably, 80:20 or 90:10 mol/mol

Conditions for the transformation can vary. Typically, the poly(vinyl alcohol) (PVA) is dissolved in DMSO, a basic reactant is added, such as potassium hydroxide, sodium hydroxide, strongly basic amine, or metal hydride, then the sulfonated alkylhalide or sultone is added slowly with gentle heating (~30 to 50° C.). Workup consists of precipitating the polymer in an appropriate solvent with subsequent washing with solvent.

An alternative synthesis of a vinyl-ester type polyelectrolyte is similar to the one above, however, the metal alkylsulfonate is used in the tetraalkylammonium form. This promotes its solubility in organic solvents other than DMSO as well as provides the final polymer as the tetraalkylammonium salt, which is advantageous for the further processing and blending with polyvinylidene fluoride (PVDF).

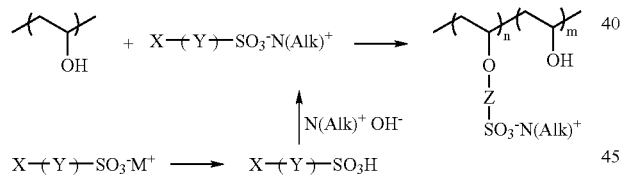

Conditions for the transformation of the alkylsulfonate are acidification of an aqueous solution of the starting Na salt to pH<0 with HCl or $H_2SO_4$, evaporation to dryness, redissolution in minimal water, and neutralization to pH>10 with the tetraalkylammonium hydroxide.

In a variation, the PVA is converted first to the metal alcoholate form. This can be accomplished by the use of an appropriate metal hydride (eg. sodium hydride, lithium-aluminum hydride) in dry solvent (DMSO). The formed metal alcoholate has increased reactivity over the alcohols in the previous examples. The haloalkylsulfonate (in $M^+$ or tetraalkylammonium form) or sultone can then be added to afford the desired polymer.

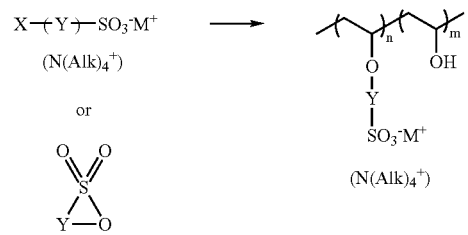

In still another useful variation, the starting polymer is poly(vinyl acetate) (PVAc), which, of course, is the precursor polymer to poly(vinyl alcohol). In this case, the ester is converted, in situ, to the alcoholate and substitution on the haloalkylsulfonate happens all in one step. This has the advantage of more widely varying conditions as the PVAc is much more soluble in organic solvents than the PVA. If the tetraalkylammonium form of the haloalkylsulfonate is used, the reaction can be mostly homogeneous as the tetraalkylammonium salts are soluble in common solvents.

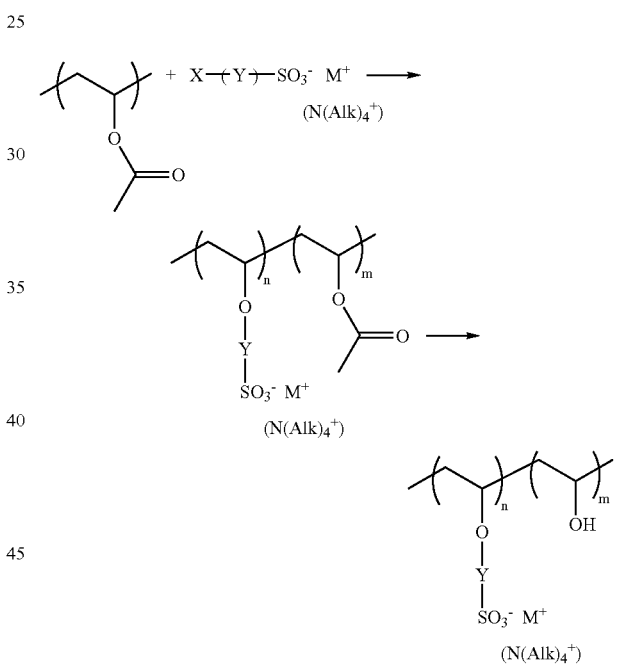

In addition to PVA being used as the starting material for the above transformations, copolymers of vinyl alcohol(or acetate) can be used. This could be advantageous as incorporation of ethylene units, for example, can assist with mechanical strength and durability. Styrenic structures can also be formed by similar mechanisms by starting with an appropriate ester- or OH functionalized poly(styrene).

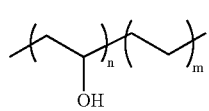

n:m>1:1 (mol/mol)

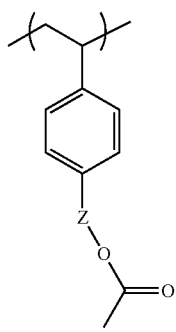

Z=bond, or aliphatic or aromatic linker

Styrenic-type Structures

The general structure of styrenic-type polyelectrolyte structures of the present invention is:

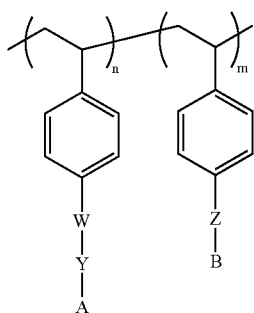

Where:
W=a bond, O, NH, S, SO, or $SO_2$
Y=alkyl, aromatic, or alkylene-etheralkylene-ether linkage of $C_1$ to $C_{12}$ [eg. $(-CH_2-)_{1-12}$]
Z=a bond, alkyl, aromatic, or alkylene-etheralkylene-ether linkage of $C_1$ to $C_{12}$
n=1-99 mol %, preferably greater than 50%, most preferably greater than 70%
m=1-99 mol %, preferably less than 50%, most preferably less than 30%
A=a sulfonate, phosphonate or carboxylate
B=a group capable of cross-linking Based on the general structure above, one can envision many routes to these types of copolymers including, but not limited to (co)polymerization of the pre-functionalized monomers, and post-polymerization modification of appropriately-functionalized polystyrenics. Some of the most preferred routes to these copolymers are outlined below.

The direct copolymerization of Sodium 4-vinylbenzylsulfonate (NaVBS) and vinylbenzylalcohol (VBA) can be carried out. These particular monomers are synthesized as described in the literature. [NaVBS—U.S. Pat. No. 2,909, 508, VBA—Bamford, C. H., and Lindsay, H.; *Polymer*, 14, 330-332 (1973).] Solution polymerization of these monomers can be carried out in an appropriate solvent (such as DMSO, NMP, DMF, DMAc and the like) using standard techniques. Copolymers of these monomers may also be synthesized in an emulsion, or inverse emulsion-type polymerization, although solution polymerization is preferred.

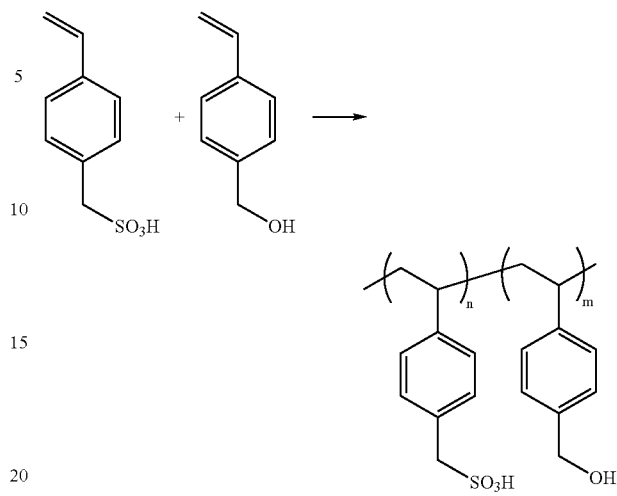

One method for synthesizing a sulfonated styrenic monomer containing a single ether linkage, and useful in forming the polyelectrolyte of the invention is shown below. VBC, a commercial product from Dow (Specialty Monomers division) is obtained as a mixture of the 3- and 4-vinyl isomers. This molecule can be reacted with various alpha-hydroxy, alpha-amino, or alpha-sulfide, omega-sulfonate molecules to afford the nucleophilic substitution of the benzylic chloride position producing a styrenic-type monomer with variable spacers between the styryl unit and the sulfonate.

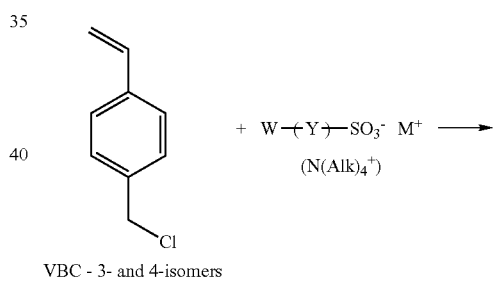

VBC - 3- and 4-isomers

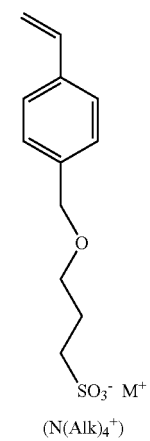

Where VBC=4-vinylbenzyl chloride, mixture of 3- and 4-vinyl isomers

W=OH, NH$_2$, or SH

Y=alkyl, aromatic, or alkylene-ether, alkylene-ether linkage of C$_1$-C$_{12}$

M=alkali earth metal (Li, Na, K, Rb, Cs) or tetraalkylammonium counterion

The structure illustrated is obtained when: W=OH, and Y=—CH$_2$—CH$_2$—CH$_2$—

The sulfonated styrenic monomer formed can then be copolymerized as previously illustrated with a hydroxyl-functionalized styrenic monomer to afford the desired copolymer structure.

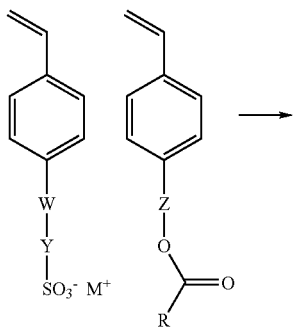

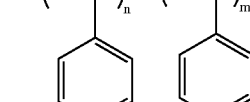

The hydroxyl (or other cross-linkable) functionality on the polyelectrolyte can be obtained from a hydroxyl functional monomer, as illustrated above. Alternately, appropriate ester-functionalized monomers may be employed during the (co) polymerization with a subsequent deprotection (transformation) of the ester to the desired alcohol. This, coupled with one of the sulfonated monomer(polymer) syntheses described above will produce the desired final (co)polymer structure, as shown below.

Where:

W=a bond, O, NH, S, SO, or SO$_2$

Y=alkyl, aromatic, alkyl-ether, or alkylene-ether linkage of C$_1$ to C$_{12}$ [e.g. (—CH$_2$—)$_{1-12}$]

Z=a bond, alkyl, aromatic, or alkylether, or alkylene-ether linkage of C$_1$ to C$_{12}$ R=alkyl or aromatic of C$_1$ to C$_{12}$ n=1-99 mol %, preferably greater than 50%, most preferably greater than 70% m=1-99 mol %, preferably less than 50%, most preferably less than 30%

The ester-containing comonomer need not even be styrenic in nature. It only need be copolymerizable with a sulfonated (or other functional) styrenic monomer.

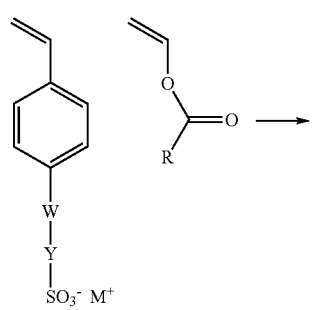

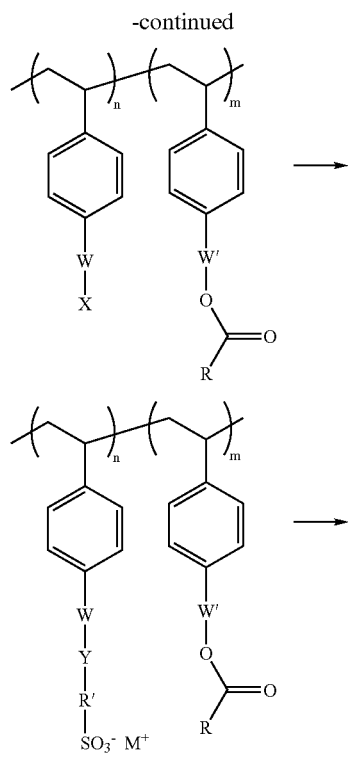

In a similar manner, the sulfonate functionality need not be incorporated in the monomer component(s) prior to polymerization. Polymerization of an appropriately-functional monomer with subsequent substitution of the sulfonate unit will produce the final structure. An example that illustrates both of these routes (sulfonate substitution and ester deprotection) is as follows:

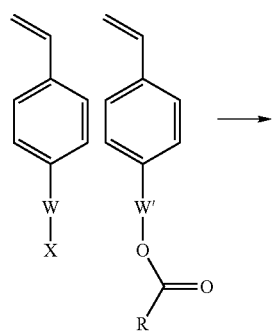

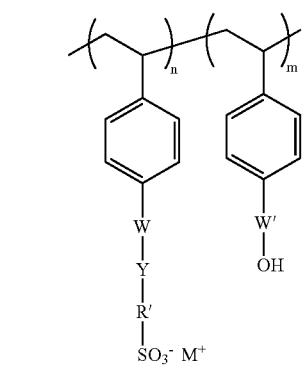

Where:
W=a bond, alkyl, alkyl-aromatic, alkylether, or alkylene-ether linkage $C_1$-$C_{12}$
X=halide (Cl, Br, I)
W'=W, where they need not be the exactly the same structure
Y=a bond, O, NH, S, SO, $SO_2$
R=alkyl or aromatic of $C_1$ to $C_{12}$
R'=alkyl or aromatic of $C_1$ to $C_{12}$, not necessarily but can be the same as R
n=1-99 mol %, preferably greater than 50%, most preferably greater than 70%
m=1-99 mol %, preferably less than 50%, most preferably less than 30%

In one embodiment, where W=$CH_2$, W'=a bond, R=$CH_3$, X=Cl, Y=O, and R'=$CH_2$—$CH_2$—$CH_2$, the synthesis of the polyelectrolyte would be:

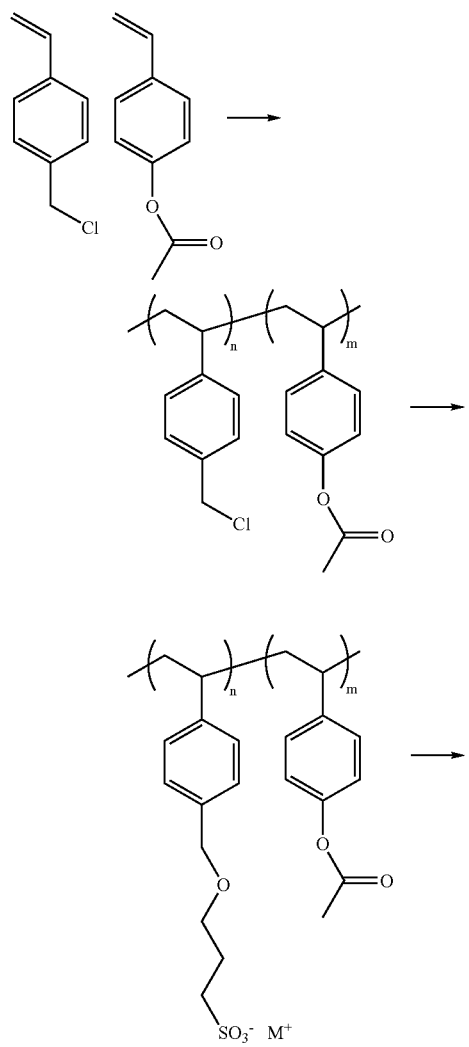

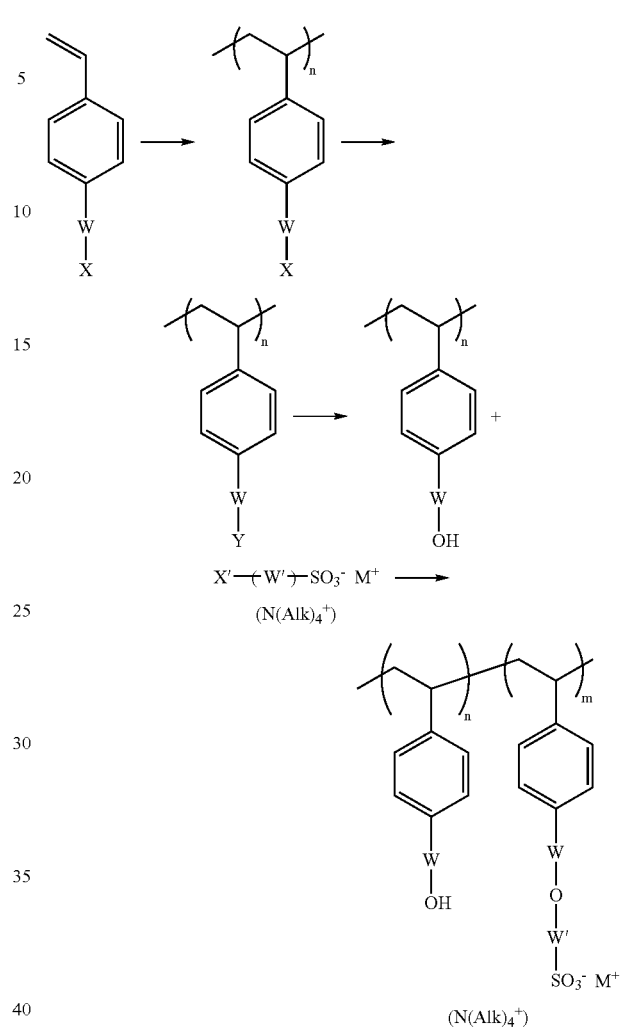

Where:
W=alkyl, aromatic, alkylether, or alkylene-ether $C_1$-$C_{12}$
W'=alkyl, aromatic, alkylether, or alkylene-ether $C_1$-$C_{12}$, but not necessarily the same as W
X=halide (Cl, Br, I)
X'=halide (Cl, Br, I) not necessarily the same as X
Y=alkyl or aromatic ester
M=alkali earth metal (Li, Na, K, Rb, Cs) or tetraalkylammonium cation A specific example would be the following:

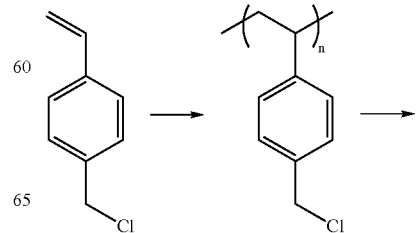

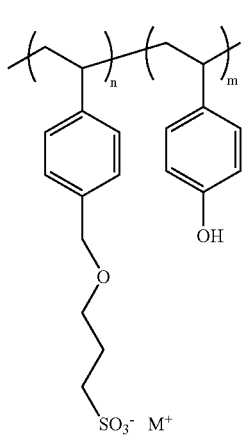

In one preferred embodiment, a copolymer polyelectrolyte of the invention is synthesized from a single homopolymer by selective functionalization to form the desired (co)polymer. The functionalization step must be very well controlled in order to produce the desired n:m ratio in the final copolymer. For example:

-continued

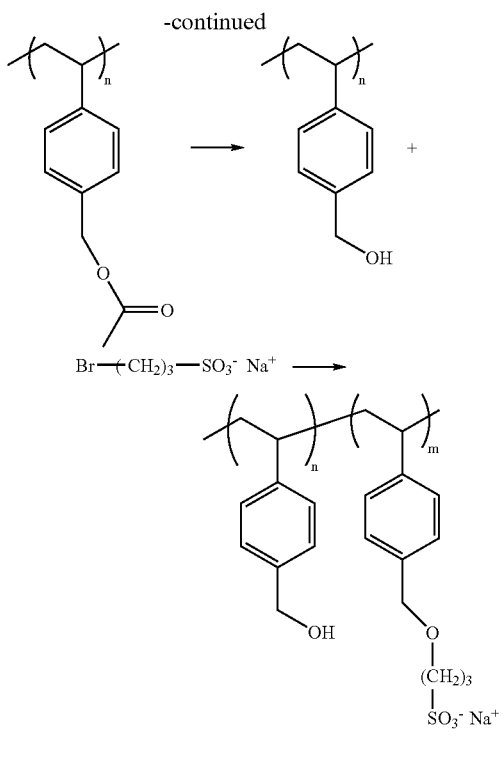

Where: W=CH$_2$, X=Cl, Y=acetate, X'=Br, W'=propyl, M=Na

In addition, the hydroxylated homopolymer can be formed by the direct polymerization of the analogous hydroxylated monomer. It need not be converted from the halide-bearing monomer. The hydroxylated homopolymer can then be used as shown above to form the desired copolymer structure.

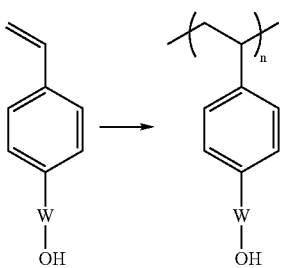

where: W=alkyl, aromatic, alkylether, or alkylene-ether C$_1$-C$_{12}$

Additional styryl-type monomers useful in the invention include, but are not limited to a sulfobetaine, meaning the monomer contains a sulfonate group as well as it's own counterion (quaternary ammonium). For styrylsulfobetaine-type monomers of the type shown below, the substitution need not be at the 2-position, and could potentially be at the 3- or 4- or multiple positions. It is also possible that the ammonium counterion be pendent to the ring, and not necessarily a pyridinium type ion as shown in this example. The hydroxyl-functionalized monomer shown is similar to those described previously in this report. The above copolymer can be produced by typical free-radical copolymerization in appropriate solvent as in the other systems and as is well known in the art.

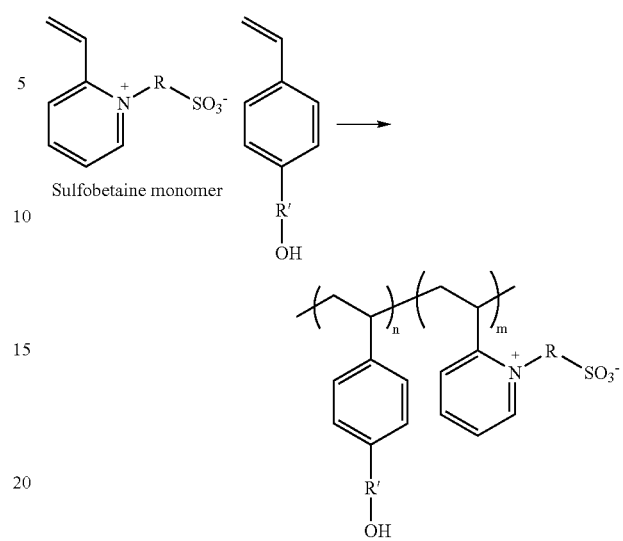

Another embodiment of the invention would be a polyelectrolyte containing a polymer or copolymer of an aromatic monomer having pendent fluorinated sulfonate groups. One example would be the monomer described in WO 99/67304, incorporated herein by reference. Monomers of this type, have the general structure:

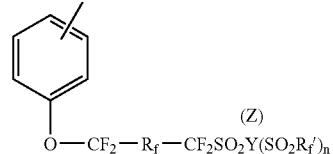

wherein R$_f$ is a fluoroalkylene or fluoroalkylene-ether; Y is C, O, or N; and R$_f'$ is fluoroalkylene or fluoroalkylene-ether; and

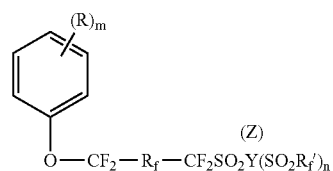

wherein (R)$_m$, is a polymerizable group, Br or I; and R$_f$, R$_f'$, and Y are as described above. The aromatic monomers having pendent fluorinated sulfonate groups can be used to form homopolymers, or they can be copolymerized with other ethylenically unsaturated monomers to form the polyelectrolyte of the invention. A preferred monomer for use in forming a copolymer is styrene. The (co)polymer is then blended into the matrix polymer.

The polyelectrolyte is blended into a polymer or copolymer matrix to form the polymer blend of the invention. The polymer blend may be any type of mixture of two or more polymers described above and throughout this application with at least one selected from the class of matrix polymers and one selected from the class of polyelectrolytes. Preferably, the polymer blend is an intimate blend of chosen polymers. The amount of matrix polymer can be from 5 to 95 weight % and the amount of polyelectrolyte can be from 95 to 5 weight %. Preferably, the matrix polymer is present in an amount of from 40% to 80 weight % and the polyelectrolyte is present at from 20 to 60 weight %.

In many cases, the acid groups present on the polyelectrolyte phase are initially in neutralized form. The cation may consist of any chosen from Group IA metals (Na, K, Cs, Rb), or alternatively an organic cation such as phosphonium, imidazolium, or benzamidazolium. In order to effectively continue the process of blending a polyelectrolyte of this invention with a matrix (co)copolymer, the sulfonic acid groups on the polyelectrolyte must first be ion-exchanged (protonated) with protons. This is accomplished by passing a solution of the polyelectrolyte through a column which has previously been loaded with an appropriate ion-exchange resin. The column can be of a range of diameters and lengths depending on the quantity of polyelectrolyte to be treated. A typical column will have a diameter of from 1.0 in. to 36.0 in., preferrably from 6.0 in. to 18.0 in. The column length will have a length of from 12.0 in. to 144.0 in, preferably from 24.0 to 72.0 in. The bottom of the column is conical-shaped and fitted with a stopcock or similar device to control the flow of liquid through the apparatus.

To afford the ion-exchange (protonation) of the polyelectrolyte, to the column is added a quantity of ion-exchange resin. Dowex Marathon (Dow Chemicals, Inc.) ion-exchange resin is one example of a classes of resins which may be used. In particular, Dowex Marathon A, Marathon B, or Marathon C resins may be used. The amount of resin loaded into the column is equivalent to at least one to ten times in relation to the number of acid groups to be ion-exchanged (per the manufacturer's specifications). Preferably, the amount of resin used is from one to five times in relation to the number of acid groups to be ion-exchanged. The column is then washed with deionized water several times until the water eluting from the column is no lower than pH=5.0. The neutralized polyelectrolyte is then dissolved in an appropriate solvent to a homogeneous solution. The solvent should be chosen according to the specific chemical functionality present in the polyelectrolyte. Typically, polar protic or polar aprotic solvents are used. The polyelectrolyte solution is added to the top of the column and allowed to drain into contact with the exchange resin. Additional solvent is added to the top of the column in an amount enough to keep the resin from drying out. The pH of the eluting solution is continually monitored. The protonated polyelectrolyte solution is collected from the bottom of the column when the pH of the eluting solution drops below 5.0. The polyelectrolyte solution collection is stopped when the pH returns to above 5.0. A protonated polyelectrolyte solution is thereby obtained. The content of any residual cation is quantified by analytical techniques familiar to those skilled in the art.

In a preferred embodiment, the blending process is begun by first reacting the acidic proton-bearing ionizable groups on the polyelectrolyte with an appropriate tetraalkylammonium hydroxide (TAA OH) to form the tetraalkylammonium salt. Preferably the ammonium salt has a molecular weight of at least 186. Examples of suitable ammonium salts include: tetramethylammonium, tetraethylammonium, tetrapropylammonium, tetrabutylammonium, tetrapentylammonium, and tetrahexylammonium.

A solution of this TAA-neutralized polyelectrolyte may then solvent-switched to a solvent which may appropriately dissolve the matrix (co)polymer of choice. If the solvent that was used in the ion-exchange column and for the TAAOH neutralization also will dissolve the matrix (co)polymer, this step will not be necessary. A preferred embodiment includes the 'switching' of solvent from that which the ion-exchange column was run to another which the TAA neutralized polyelectrolyte and the matrix (co)polymer are both fully soluble. This process preferably consists of adding the new solvent to the TAA neutralized polyelectrolyte solution then removing the original solvent with heating and application of vacuum (vacuum distillation). Other processes for affording this 'solvent switch' include precipitation of the TAA-neutralized polyelectrolyte with subsequent filtration of the polymer and redissolution in the new solvent. Once all of the original solvent has been removed, an appropriate amount of matrix (co)polymer, which has previously been dissolved in the same solvent is added. As stated above, the amount of matrix polymer can be from 5 to 95 weight % and the amount of polyclectrolyte can be from 95 to 5 weight % in the blend solution. Preferably, the matrix polymer is present in an amount of from 40% to 80 weight % and the polyelectrolyte is present at from 20 to 60 weight % in the blend solution. This blended solution is then cast into a thin film or further processed to yield a useful article such as an ion-exchange membrane.

Casting of the blended solution can be carried out by many different procedures familiar to those skilled in the art. Particularly, solution casting with heating is selected. A quantity of the polymer blend solution is placed on an appropriate substrate. A sharp metal knife is then drawn across the substrate with a gap between the knife and the substrate. The thickness of this gap and the viscosity of the polymer blend solution control the thickness of the formed film. The thickness of the formed film is dependent on the end-use of the material, and can vary from 1.0 μm to 2.0 mm. Preferably, the formed film has a thickness of 10.0 μm to 500.0 μm and most preferrably from 20.0 μm to 250.0 μm. This 'wet' film is then dried in a air-circulating oven at elevated temperature. The time and temperature for drying the film can vary widely. The temperature used is from 20° C. to 250° C., preferably from 100° C. to 220° C., and most preferably from 120° C. to 200° C. The drying time for the wet film can also vary widely. The oven residence time should be commercially applicable and scalable in that it can be from 1.0 s to 24 h, preferably from 1.0 min. to 2.0 h, and most preferably from 1.0 min. to 45.0 min.

The thickness of the final, dried film depends on the original thickness of the wet film before drying. This thickness will vary depending on the application intended for the final atricle. The thickness can be from 1.0 μm to 2.0 mm, preferrably from 5.0 μm to 500.0 μm, most preferrably from 10.0 μm to 300.0 μm. The dried film is removed from the substrate by typical methods familiar to those skilled in the art. Typically, the film is mechanically peeled from the substrate directly or with the aid of a metal knife. Alternatively, the film can be hydrated or submersed in water or solvent to aid in the removal of the film from the substrate.

The domain size of the polyelectrolyte in a cast film should be preferably less than 1.0 μm, and more preferably between 1 nm to 500 nm. The domain sizes discussed herein are with respect to maximum domain sizes and/or average domain sizes. In a preferred embodiment, the domain sizes recited are the maximum domain sizes, but can be the average domain sizes.

The proton conductivity of the polymer blend of the invention is >20 mS/cm, preferably >50 mS/cm, and most preferably >100 mS/cm. Additionally, the polymer blend has a high degree of mechanical strength, a low swelling when hydrated, hydrolytic (chemical) stability, and a low level of sulfur loss (if sulfonated) in hot water or hot acid environments.

An article, such as a membrane, produced from the polymer blend of the invention can then be used as-is or further treated by an acidic washing step to remove the tetraalkyl groups, concurrently reprotonating the ionizable groups present on the starting (co)polymer component. In addition, cross-linking may be employed to improve dimensinal stability. Cross-linking may be carried out by the action of an external agent on pendent functionalities present on the polyelectrolyte, the matrix (co)polymer, or combinations thereof. It is also feasible to incorporate internal cross-linking groups which are already pendent on either the polyelectrolyte or the matrix (co)polymer, which are then appropriately activated by application of an external impetus (heat or radiation).

Due to the various advantages described above, the applications of the present invention can include, but are not limited to, films, membranes, fuel cells, coatings, ion exchange resins, oil recovery, biological membranes, batteries, and the like. The resultant articles can be utilized as perm-selective membranes for battery or fuel cell applications. In addition, the resultant articles may be applied to electrodes for the construction of a membrane-electrode-assembly, may be imbibed with various liquids, or may be introduced onto or into a reinforcing matte or porous web to increase mechanical integrity.

A polymeric ion membrane or polyelectrolyte membrane can be made from the polymer blend of the present invention. The formed film or membrane may be used as a single layer, or may be part of a multi-layer film or membrane. The polymeric ion membrane can be prepared from conventional film preparation methods, such as melt extrusion, solvent cast, latex cast, and the like. Membrane electrode assemblies can be made from the membranes of the present invention and fuel cells using this membrane electrode assembly can be prepared. In using the polymers of the present invention to form membranes, the polymer can have any equivalent weight (g of acid groups per g of total polymer) and preferably has an equivalent weight of from about 200 to about 8,000, and preferably from about 200 to about 1,500 and even more preferably from about 200 to about 1,400, with respect to the polyelectrolyte present in the polymer blend.

In more detail, the compositions of the present invention are especially useful in fuel cells, batteries, and the like. The design and components used in the fuel cell and batteries would be the same as in conventional fuel cells and batteries except using the compositions of the present invention in the formation of the polymeric ionic exchange membrane. Accordingly, the designs and manners of making the fuel cells and batteries as described in U.S. Pat. No. 5,795,668, EP 1 202 365 A1, PCT Publication No. WO 98/22989, WO 02/075835, and WO 98/20573, Lin et al., Journal of Applied Polymer Science, Vol. 70, 121-127 (1998) can be used in the present invention and are fully incorporated herein in their entireties by reference. The membrane can be used alone or with conventional fillers, such as silica and the like. The fuel cell may use a liquid or gaseous fuel such as a liquid hydrocarbon like methanol or gas like hydrogen. The fuel cell of the present invention is capable of operating at a wide range of operating conditions. The fuel cell of the present invention can have a porous support layer and an ion exchange resin wherein the ion exchange resin is supported on at least one side of the porous support layer. The present invention can be useful in hydrogen, direct methanol, or other fuel cells. Preferably, the fuel cells of the present invention have low fuel crossover, high protonic conductivity, and/or high mechanical strength. The thickness of the membrane can be conventional but is preferably from about 0.5 to about 10 mils and more preferably from about 0.5 mil to about 5 mils. Further, the membrane preferably has an equivalent weight of from about 200 to about 2500, and more preferably about 200 to about 1400. The porous support layer can be made from any conventional material such as a fluoro-containing polymer or other hydrocarbon containing polymers such as polyolefin. The porous support layer has conventional parameters with respect to pore diameter, porosity, and thickness. The fuel cells of the present invention preferably have excellent proton conductivity, chemical resistance and low gas cross-over, relatively high electrical resistance, and high protonic conductivity.

EXAMPLES

Sulfoalkylated Poly(vinyl alcohol) Syntheses

Example 1

Sulfopropylated PVA (40% Sulfonated, Method 1)

5.0 g of poly(vinyl alcohol) (PVA) (99% hydrolyzed, Mw~144 k, Aldrich) was dissolved in 200 mL of anhydrous DMSO at 90° C., then cooled to room temperature. Separately, 28.80 g (1.13 eq. to OH) of sodium 3-bromopropane sulfonate (NaBPS) was dissolved in 100 mL of anhydrous DMSO under nitrogen. 3.0 g (1.1 eq. to OH) of sodium hydride (NaH) was dissolved in 150 mL of anhydrous DMSO under nitrogen to form a slurry. The NaH slurry was quickly added under nitrogen to a 2 L round-bottom flask equipped with 250 mL addition funnel, mechanical stirrer, and septum. The PVA solution was then charged into the addition funnel and added slowly to the NaH slurry with rapid stirring. This mixture was stirred for 1 h until gas evolution ceased. The NaBPS solution was then quickly added, and the reaction mixture was stirred at room temperature for 18 h. 1.0 mL of 5.0 wt.-% aqueous hydrochloric acid was added, then the reaction solution was poured into 2 L of rapidly-stirred acetone. An off-white precipitate was filtered, washed with 500 mL of acetone, and dried in vacuo. (8.50 g, 40%) $^1$H NMR (D$_2$O): $\delta$ 4.40-$\delta$ 3.80 (broad, 4.79H, backbone CH—O, propyl O—CH$_2$), $\delta$ 3.35-$\delta$ 3.15 (broad, 2H, propyl CH$_2$—SO$_3$), $\delta$ 2.40-$\delta$ 2.20 (broad, 2H, propyl C—CH$_2$—C), $\delta$ 2.20-$\delta$ 1.70 (broad, 4.82H, backbone CH$_2$).

Example 2

Sulfopropylated PVA (60% Sulfonated, Method 1)

The procedure as outlined in Example 1 of this section was followed exactly except that 43.33 g of NaBPS (1.7 eq. to OH) dissolved in 200 mL of anhydrous DMSO was used. (12.65 g, 59%) $^1$H NMR (D$_2$O): $\delta$ 4.40-3.80 (broad, backbone CH—O, propyl O—CH$_2$), $\delta$ 3.35-$\delta$ 3.15 (broad, 2H, propyl CH$_2$—SO$_3$), $\delta$ 2.40-$\delta$ 2.20 (broad, 2H, propyl C—CH$_2$—C), $\delta$ 2.20-$\delta$ 1.70 (broad, 3.23H, backbone CH$_2$).

Example 3

Sulfopropylated PVA (10% Sulfonated, Method 1)

The procedure as outlined in Example 1 of this section was followed exactly, except that 20.0 g of PVA dissolved in 300 mL of anhydrous DMSO, 15.46 g NaBPS (0.15 eq. to OH) dissolved in 200 mL of anhydrous DMSO, and 1.66 g (0.15 eq. to OH) NaH in 100 mL anhydrous DMSO was used. (26.5 g, 75%) $^1$H NMR (D$_2$O): $\delta$ 4.40-3.80 (broad, 14H, backbone CH—O, propyl O—CH$_2$), $\delta$ 3.35-$\delta$ 3.15 (broad, 2H, propyl CH$_2$—SO$_3$), δ 2.40-δ 2.20 (broad, 2.17H, propyl C—CH$_2$—C), δ 2.20-δ 1.70 (broad, 23.5H, backbone CH$_2$).

Example 4

Sulfopropylated PVA (100% Sulfonated, Method 2)

5.0 g of poly(vinyl alcohol) (PVA) (99% hydrolyzed, Mw~144 k, Aldrich) was dissolved in 200 mL of anhydrous DMSO at 90° C., then cooled to room temperature. Separately, 13.90 g (1.00 eq. to OH) of propane sultone was dissolved in 50 mL of anhydrous DMSO under nitrogen. 3.0 g (1.1 eq. to OH) of sodium hydride (NaH) was dissolved in 150 mL of anhydrous DMSO under nitrogen to form a slurry. The NaH slurry was quickly added under nitrogen to a 2 L round-bottom flask equipped with 250 mL addition funnel, mechanical stirrer, and septum. The PVA solution was then charged into the addition funnel and added slowly to the NaH slurry with rapid stirring. This mixture was stirred for 1 h until gas evolution ceased. The propane sultone solution was then added over 15 min, and the reaction mixture was stirred at room temperature for 18 h. 1.0 mL of 5.0 wt.-% aqueous hydrochloric acid was added, then the reaction solution was poured into 2 L of rapidly-stirred acetone. An off-white precipitate was filtered, washed with 500 mL of acetone, and dried in vacuo. (20.2 g, 95%) $^1$H NMR (D$_2$O): δ 4.40-3.80 (broad, 2.66H, backbone CH—O, propyl O—CH$_2$), δ 3.35-δ 3.15 (broad, 2H, propyl CH$_2$—SO$_3$), δ 2.40-δ 2.20 (broad, 2H, propyl C—CH$_2$—C), δ 2.20-δ 1.70 (broad, 1.98H, backbone CH$_2$).

Example 5

SulfopropylatedPVA (70% Sulfonated, Method 2)

The procedure as outlined in Example 4 of this section was followed exactly, except that 25.0 g of PVA dissolved in 450 mL of anhydrous DMSO, 51.0 g propane sultone (0.80 eq. to OH) dissolved in 100 mL of anhydrous DMSO, and 10.91 g (0.80 eq. to OH) NaH in 450 mL anhydrous DMSO was used. (106.8 g, 128% (DMSO impurity)) $^1$H NMR (D$_2$O): δ 4.40-3.80 (broad, 3.17H, backbone CH—O, propyl O—CH$_2$), δ 3.35-δ 3.15 (broad, 2H, propyl CH$_2$—SO$_3$), δ 2.40-δ 2.20 (broad, 2H, propyl C—CH$_2$—C), δ 2.20-δ 1.70 (broad, 2.65H, backbone CH$_2$).

Example 6

SulfopropylatedPVA (50% Sulfonated, Method 2)

The procedure as outlined in Example 4 of this section was followed exactly, except that 20.0 g of PVA dissolved in 200 mL of anhydrous DMSO, 28.10 g propane sultone (0.50 eq. to OH) dissolved in 100 mL of anhydrous DMSO, and 5.46 g (0.50 eq. to OH) NaH in 150 mL anhydrous DMSO was used. (52.5 g, 99%) $^1$H NMR (D$_2$O): δ 4.40-3.80 (broad, 3.83H, backbone CH—O, propyl O—CH$_2$), δ 3.35-δ 3.15 (broad, 2H, propyl CH$_2$—SO$_3$), δ 2.40-δ 2.20 (broad, 2H, propyl C—CH$_2$—C), δ 2.20-δ 1.70 (broad, 3.87H, backbone CH$_2$).

Example 7

Sulfobutylated PVA

The procedure as outlined in Example 4 of this section was followed exactly, except that 34.0 g of PVA dissolved in 350 mL of anhydrous DMSO, 85.0 g (63.6 mL) butane sultone (0.80 eq. to OH), and 19.47 g (1.05 eq. to OH) NaH in 250 mL anhydrous DMSO was used. (128.7 g, 103% (residual DMSO)) $^1$H NMR (D$_2$O): δ 6.05-5.81 (broad m, 0.29H, allyl CH), δ 5.25-δ 5.05 (broad m, 0.58H, allyl CH$_2$), δ 4.16-δ 3.40 (broad, 2.45H, backbone CH—O, butyl —O—CH$_2$), δ 3.10-δ 2.85 (broad m, 2H, butyl —CH$_2$—SO$_3$), δ 2.60-δ 2.40 (broad m, 0.59H allyl C=C—CH$_2$—), δ 2.10-δ 0.50. (broad, 5.42H, butyl —CH$_2$—CH$_2$—, backbone —CH$_2$—)

Sulfoalkylated Polystyrenic Copolymer Syntheses

Monomer Syntheses

Example 8

Sodium Vinylbenzyl Sulfonate (NaVBS), Procedure A

A solution of sodium sulfite (872.1 g, 6.919 mol, Aldrich) and tetrabutylammonium chloride (37.0 g, 0.133 mol, Fluka) in deionized water (6000.0 g, 6.00 L) was charged into a 22 L round-bottom flask and heated to 45° C. with mechanical stirring. Separately, vinylbenzyl chloride (1000.0 g, 6.29 mol, Dow, 96% pure, 57% meta, 43% para) was added to a solution of sodium iodide (1037 g, 6.919 mol, Aldrich) in acetone (4740 g, 6.00 L), which was added to a 12 L round-bottom flask and stirred at 40° C. for 0.25 h. The precipitate (NaCl) was removed by filtration and washed with 200 mL of acetone. The filtered acetonic solution was immediately added to the aqueous salt solution. The two-phase mixture was stirred at 40° C. for 80 min. The acetone was evaporated in vacuo. The remaining aqueous mixture was filtered to give wet sodium vinylbenzylsulfonate (NaVBS), as white paste. The paste was dried in vacuo. (694 g, 50.1%) $^1$H NMR (D$_2$O): δ 7.30-7.55 (m, 4H, aromatic), 66.80 (dd, 1H, vinyl), δ 5.87 (dd, 1H, vinyl), δ 5.33 (dd, 1H, vinyl), δ 4.16 (s, 2H, benzyl).

Example 9

Sodium Vinylbenzyl Sulfonate (NaVBS), Procedure B

A 100 gal. glass-lined reactor was charged with 46.5 gal. of water and 20.0 gal. of acetone at room temperature. To that mixture was added 18.0 kg. of sodium sulfite, 1.0 kg. of sodium iodide, and 20.0 kg. of vinylbenzyl chloride (Dow Specialty Monomers, 55% meta 45% para isomer). This mixture was sparged with nitrogen for 30 min. then heated to 50° C. and maintained at that temperature for 24 h. The acetone and approximately 20 gal. of water were then removed by vacuum distillation. The remaining slurry was cooled to 10° C. and filtered, recovering a light yellow solid. The filtrate was returned to the reactor, and an additional 15 gal. of water was removed by vacuum distillation. The solids were combined and dried in vacuo at 40° C. Recovered yield was 13.1 kg (45%). $^1$H NMR (D$_2$O): NMR data missing Example 10

Vinylbenzyl Alcohol (VBA), Procedure A

Vinylbenzyl chloride (VBC, 90%, mixture of meta and para isomers, stabilized, 4.3 g, 25 mmol) was added to a mixture of potassium acetate (KOAc) (3.2 g, 33 mmol) in DMSO (11.0 g). The mixture was stirred at 40° C. for 2 h. A 5 mL sample of reaction mixture was withdrawn and added to 10 mL of water. This solution was extracted twice with 20 mL of ethyl acetate. Evaporation of the ethyl acetate yielded a yellow oil. $^1$H NMR (DMSO-d6): δ 7.35 (m, 4H, aromatic), δ 6.70 (m, 1H, vinyl), δ 5.75 (d, 1H, vinyl), δ 5.25 (d, 1H, vinyl) δ 5.07 (s, 2H, benzyl) δ 2.07 (s, 3H, methyl ester).

Ethanol (7 mL), DI water (36 mL), and NaOH (1.19 g, 30 mmol) were added to the remaining reaction mixture, and refluxed for 1 h. Extraction with 40 mL of EtOAc followed by drying over MgSO$_4$ and evaporation of the solvent yielded a yellow oil (3.18 g, 99% yield). $^1$H NMR (DMSO-d6): δ 7.35 (m, 4H, aromatic), 66.70 (m, 1H, vinyl), δ 5.75 (d, 1H, vinyl), δ 5.25 (d, 1H, vinyl), δ 4.65 (d, 2H, benzyl).

Example 11

Vinylbenzyl Alcohol (VBA), Procedure B

A 12 L, three-necked round-bottom flask was equipped with mechanical stirrer, condensor, and thermocouple. To this flask was added 2.3 L of glacial acetic acid, 663.0 g of potassium acetate, and 613.7 g of vinylbenzyl chloride. This mixture was stirred at 110° C. for 18 h. Thin layer chromatography was the used to determine the extent of the reaction. The product was extracted with 2 L of EtOAc (ethyl acetate) two times. The organic extracts were combined and washed with an aqueous solution of NaHCO$_3$ (sodium bicarbonate) until neutral (ph~7) and then washed again with 2 L of water. EtOAc was removed under reduced pressure to give 703 g of a light brown oil. (99% yield). $^1$H NMR (DMSO-d6): δ 7.35 (m, 4H, aromatic), δ 6.70 (m, 1H, vinyl), δ 5.75 (d, 1H, vinyl), δ 5.25 (d, 1H, vinyl), δ 5.07 (s, 2H, benzyl), δ 2.07 (s, 3H, methyl ester).

A second 12 L flask equipped with mechanical stirrer, condensor, and thermocouple was charged with 761.0 g (13.56 mol) KOH (potassium hydroxide), 3.5 L (86.6 mol) of MeOH (methanol), 1.1 L (58.38 mol) of water, and 703 g of vinylbenzyl acetate from the previous step producing a dark red-colored solution. The reaction was heated to reflux and followed by TLC, which indicated that the reaction was complete after 1 hour. The reaction mixture was cooled to room temperature and extracted twice with 4 L of diethyl ether. The ether layer was then washed with three times with 4 L of aqueous sodium chloride, then two times with 4 L of water. The ether layer was dried with MgSO$_4$ (magnesium sulfate) and filtered. Ether was removed from the filtrate under reduced pressure to give a brown oil. (487.0 g, 91% yield) (94% overall). $^1$H NMR (DMSO-d6): δ 7.35 (m, 4H, aromatic), δ 6.70 (m, 1H, vinyl), δ 5.75 (d, 1H, vinyl), δ 5.25 (d, 1H, vinyl), δ 4.65 (d, 2H, benzyl).

Example 12

4-(vinylphenyl)magnesium chloride (VP-MgCl)

A 250 ml 2-neck, round-bottom flask was charged with 2.5 g of magnesium (Mg) filings (0.14 mol), a stir bar, an addition funnel and a condenser. The Mg filings were stirred vigorously under nitrogen overnight. A solution of 100 μL of 1,2-dibromoethane in 10 ml dry tetrahydrofuran (THF) was added to the Mg via syringe. This mixture was stirred at room temperature until it turned light brown. 13.85 g of 4-chlorostyrene (0.1 mol) in 30 ml dry THF was added via the additional funnel over 1 hour, while maintaining the reaction temperature below 10° C. After all of the 4-chlorostyrene was added, the mixture was warmed to room temperature and stirred for an additional 30 min. The temperature was then increased and the reaction was refluxed for 2 more hours. The reaction was cooled to 0° C. and used immediately for subsequent reactions.

Example 13

1-(4-Vinylphenyl)ethanol (1-VPE)

To a VP-MgCl solution as prepared in Example 12 of this section was added a solution of 4.84 g acetylaldehyde (0.11 mol) in 50 ml THF. The solution was added dropwise via addition funnel while maintaining the reaction temperature at 0° C. The reaction was then stirred for an additional 1 h at 0° C. 60 ml of 2 M aqueous hydrochloric acid (HCl) solution was added via the addition funnel, maintaining the temperature below 20° C. The reaction was filtered and extracted two times with 100 mL of diethyl ether. The organic phases were combined, dried over MgSO$_4$ and filtered. The diethyl ether was removed by vacuum evaporation at room temperature. (13.6 g light yellow oil, 91.6%). $^1$H NMR (DMSO-d6): δ 7.40 (m, 4H, aromatic), δ 6.72 (m, 1H, vinyl), δ 5.82 (d, 1H, vinyl), δ 5.23 (d, 1H, vinyl), δ 4.73 (q, 1H, CH—O), δ 1.35 (d, 3H, CH$_3$).

Example 14

2-(4-Vinylphenyl)ethanol (2-VPE) Make "Example 14A"

To a VP-MgCl solution as prepared in Example 12 of this section was added a solution of 4.84 g ethylene oxide (0.11 mol) in 50 ml THF. The solution was added via additional funnel over one hour, maintaining the reaction mixture at 0° C. Keep stir at 0° C. for one more hour after the addition was finished. The reaction was then stirred for an additional 1 h at 0° C. 60 ml of 2 M aqueous hydrochloric acid (HCl) solution was added via the addition funnel, maintaining the temperature below 20° C. The reaction was filtered and extracted two times with 100 mL of diethyl ether. The organic phases were combined, dried over MgSO$_4$ and filtered. The diethyl ether was removed by vacuum evaporation at room temperature. 11.2 g white waxy solid, 75.7%). $^1$H NMR (DMSO-d6): δ 7.20-δ 7.40 (m, 4H, aromatic), δ 6.72 (m, 1H, vinyl), δ 5.75 (d, 1H, vinyl), δ 5.23 (d, 1H, vinyl), δ 4.70 (t, 1H, OH), δ 3.65 (t, 2H, CH$_2$—O), δ 2.72 (t, 2H, CH$_2$—C).

(Co)Polymer Syntheses (Polymerizations)

Example 14

Poly(NaVBS) Make "Example 14B"

A solution of sodium vinylbenzylsulfonate (20.00 g, 0.073 mol, 80% pure) in deionized water (266 g) was heated to 40° C. while stirring, and then sparged with nitrogen for 10 min. Vazo 56WSP (74 mg, 0.27 mmol, DuPont) was added toward the end of the sparging period. The reaction mixture was heated to 85° C. and stirred for 24 h. The polymer was precipitated into acetone (2.25 L), and the liquid was decanted. Drying in vacuo yielded poly(sodium vinylbenzylsulfonate) (translucent plates, 14.55 g, 91%). (GPC: Mw=91 k, PDI=2.2 vs. polyacrylic acid narrow standards), $^1$H NMR (D$_2$O): δ 7.22 (broad, 2H, aromatic), δ 6.67 (broad, 2H, aromatic), δ 4.15 (broad, 2H, benzyl CH$_2$), δ 0.30-2.55 (broad, 3H, backbone CH, CH$_2$).

Example 15

Poly(VBA)

10.0 g of vinylbenzyl alcohol (VBA) (74.6 mmol), 29.0 mL deionized water, 3.82 mL of aqueous 20.0 wt.-% sodium dodecyl sulfate (SDDS) (2.48 mmol), 1.83 mL of aqueous 5.0 wt.-% sodium bicarbonate (NaHCO$_3$) (0.86 mmol), and 1.83 mL of aqueous 5.0 wt.-% potassium persulfate (0.5 mol.-% to VBA) was added to a 100 mL round-bottom flask. This mixture was cooled to 0° C. for 1 h, after which 1.30 mL of aqueous 5.0 wt.-% sodium metabisulfite (0.5 mol.-% to VBA) was added. The solution was sparged with nitrogen for 15 min. The flask was closed with a rubber septum and placed in an oil bath at 30° C. for 2.5 h. After that time, the polymer was precipitated in 300 mL of methanol, filtered and dried in vacuo. (9.80 g, 98%), (GPC: Mw=80 k, PDI=4.0 vs. polyacrylic acid narrow standards), $^1$H NMR (DMSO-d6): δ 7.30-δ 6.10 (broad, 4H, aromatic), δ 4.65-δ 4.25 (broad, 2H, benzylic CH$_2$), δ 2.20-δ 0.90 (broad, 3H, backbone CH, CH$_2$).

Example 16

Poly(VBC)

50.0 g of vinylbenzyl chloride (VBC) (Dow Specialty Monomers, 55% 3- and 45% 4-isomer), 145.0 mL deionized water, 16.65 mL of aqueous 20.0 wt.-% sodium dodecyl sulfate (SDDS) (12.40 mmol), 8.0 mL of aqueous 5.0 wt.-% sodium bicarbonate (NaHCO$_3$) (3.75 mmol), and 8.0 mL of aqueous 5.0 wt.-% potassium persulfate (0.5 mol.-% to VBC) was added to a 500 mL round-bottom flask. This mixture was cooled to 0° C. for 1 h, after which 5.65 mL of aqueous 5.0 wt.-% sodium metabisulfite (0.5 mol.-% to VBC) was added. The solution was sparged with nitrogen for 15 min. The flask was closed with a rubber septum and placed in an oil bath at 30° C. for 3 h. After that time, the polymer was precipitated in 1500 mL of methanol, filtered and dried in vacuo. (47.5 g, 95%), (GPC: Mw=733 k, PDI=6.3 vs. polyacrylic acid narrow standards), $^1$H NMR (DMSO-d6): δ 7.30-δ 6.20 (broad, 4H, aromatic), δ 4.75-δ 4.30 (broad, 2H, benzylic CH$_2$), δ 2.40-δ 0.90 (broad, 3H, backbone CH, CH$_2$).

Example 17

Poly(t-BuOS) Procedure A 8.79 g of t-butoxystyrene (t-BuOS) (46.3 mmol), 23.3 mL deionized water, 3.82 mL of aqueous 20.0 wt.-% sodium dodecyl sulfate (SDDS) (2.48 mmol), 1.83 mL of aqueous 5.0 wt.-% sodium bicarbonate (NaHCO$_3$) (0.86 mmol), and 1.29 mL of aqueous 5.0 wt.-% potassium persulfate (0.5 mol.-% to t-BuOS) was added to a 100 mL round-bottom flask. This mixture was cooled to 0° C. for 1 h, after which 0.92 mL of aqueous 5.0 wt.-% sodium metabisulfite (0.5 mol.-% to t-BuOS) was added. The solution was sparged with nitrogen for 15 min. The flask was closed with a rubber septum and placed in an oil bath at 30° C. for 3 h. After that time, the polymer was precipitated in 300 mL of methanol, filtered and dried in vacuo. (6.15 g, 70%), (GPC: Mw=1200 k, PDI=10.0 vs. polystyrene narrow standards), $^1$H NMR (DMSO-d6): δ 6.75-δ 6.20 (broad, 4H, aromatic), δ 2.13-δ 0.80 (broad, 12H, backbone CH, CH$_2$, t-butyl CH$_3$).

Example 18

Poly(t-BuOS) Procedure B

The polymerization was carried out in identical fashion as described for 'Procedure A' (Example 17) except 1.0 mol.-% of initiator vs. t-BuOS was used: ie. 2.58 mL of aqueous 5.0 wt.-% potassium persulfate, 1.84 mL of aqueous 5.0 wt.-% sodium metabisulfite. (GPC: Mw=700 k, PDI=5.0 vs. polystyrene narrow standards), $^1$H NMR (DMSO-d6): δ 6.75-δ 6.20 (broad, 4H, aromatic), δ 2.13-δ 0.80 (broad, 12H, backbone CH, CH$_2$, t-butyl CH$_3$).

Example 19

Poly(t-BuOS) Procedure C

The polymerization was carried out in identical fashion as described for 'Procedure A' (Example 17) except 1.5 mol.-% of initiator vs. t-BuOS was used: ie. 3.87 mL of aqueous 5.0 wt.-% potassium persulfate, 2.76 mL of aqueous 5.0 wt.-% sodium metabisulfite. (GPC: Mw=185 k, PDI=4.0 vs. polystyrene narrow standards), $^1$H NMR (DMSO-d6): δ 6.75-δ 6.20 (broad, 4H, aromatic), δ 2.13-δ 0.80 (broad, 12H, backbone CH, CH$_2$, t-butyl CH$_3$).

Example 20

Poly(Acetoxystyrene)

10.0 g of acetoxystyrene (AcS) (Aldrich, 96%), 29.0 mL deionized water, 3.33 mL of aqueous 20.0 wt.-% sodium dodecyl sulfate (SDDS) (2.48 mmol), 1.6 mL of aqueous 5.0 wt.-% sodium bicarbonate (NaHCO3) (0.75 mmol), and 1.6 mL of aqueous 5.0 wt.-% potassium persulfate (0.5 mol.-% to AcS) was added to a 100 mL round-bottom flask. This mixture was cooled to 0° C. for 1 h, after which 1.13 mL of aqueous 5.0 wt.-% sodium metabisulfite (0.5 mol.-% to AcS) was added. The solution was sparged with nitrogen for 15 min. The flask was closed with a rubber septum and placed in an oil bath at 30° C. for 3 h. After that time, the polymer was precipitated in 300 mL of methanol, filtered and dried in vacuo. (9.50 g, 95%), (GPC: Mw=554 k, PDI=4.0 vs. polyacrylic acid narrow standards), $^1$H NMR (DMSO-d6): δ 7.00-δ 6.25 (broad, 4H, aromatic), δ 2.38-δ 2.00 (broad, 3H, acetyl CH$_3$), δ 2.05-δ 1.00 (broad, 3H, backbone CH, CH$_2$).

Example 21

Poly(NaVBS-co-VBA)

Vinylbenzyl alcohol (207 g, 1.39 mol) was added to a solution of sodium vinylbenzylsulfonate (NaVBS, 1058 g, 2.49 mol, 51.9% monomer, 35.1% water, 13% iodide impurity) in deionized water (8766 g) at 35° C. The mixture was sparged with nitrogen for 0.5 h. Vazo 56WSP (2.71 g, 10.0 mmol, DuPont) was added toward the end of the sparging period. The reaction mixture was heated to 80° C. and stirred under nitrogen for 3.5 h. A second charge of Vazo 56WSP (1.35 g, 5.00 mmol) was added after 3.5 h of reaction time, and the polymerization was continued for another 2 h. Following the polymerization, the solution was kept at 80° C. and purged with nitrogen in order to reduce the volume by about 50%. The polymer was precipitated from acetone. The percent conversion of NaVBS to polymer was estimated gravimetrically and spectrophotometrically (95% conversion). $^1$H NMR (D$_2$O): δ 7.16 (broad, 2H, aromatic), δ 6.63 (broad, 2H, aromatic), δ 4.43 (broad, 0.4H, benzyl alcohol CH$_2$), δ 4.08 (broad, 1.6H, benzylsulfonate CH$_2$), δ −0.75-2.75 (broad, 3H, backbone CH, CH$_2$).

Example 22

Poly(NaVBS-co-HEMA)

9.30 g (42.2 mmol) of NaVBS was dissolved in water at 40° C. in a 250 mL round bottom flask. This solution was purged with nitrogen for 15 min. 1.22 g (9.39 mmol) of 2-hydroxyethyl methacrylate (HEMA) and 34.11 mg (0.1258 mmol) of VAZO 56WSP were added to the solution. The mixture was heated for 24 h at 85° C. The polymer was precipitated in 875 ml of acetone and dried in vacuo. (Yield 9.22 g, 92%) Gel Permeation Chromatography indicated high molecular weight (280 k, vs. polystyrene sulfonate narrow standards). $^1$H NMR (D$_2$O): δ 7.50-δ 6.25 (broad, 4H, aromatic), δ 4.25-δ 3.75 (broad, 2H, benzylic), δ 3.60-δ 2.80 (broad, 1.08H, ethyl CH$_2$), δ 2.50-δ 1.00 (broad, backbone CH, CH$_2$), δ 1.0-δ 0.20 (broad, 0.84H, CH$_3$). 22% incorporation of HEMA calculated from $^1$H NMR data.

Example 23

Poly(NaVBS-co-1-VPE)

A 250 ml round-bottom flask was charged with 6.60 g NaVBS (30.0 mmol), 2.96 g 1-VPE (20.0 mmol), 27.0 mg Vazo 56WSP (0.10 mmol), 66.0 ml water and a stir bar. The mixture was bubbled with nitrogen for 15 min., the flask was closed with rubber septa and put into an oil bath at 80° C. with vigorous stirring for 24 h. The reaction mixture was then slowly precipitated into 300 ml of acetone with vigorous stirring. The white precipitate was filtered and washed with acetone and dried in vacuo. (7.90 g, 83%, Mw=45 k, PDI=2.25 vs. sulfonated polystyrene narrow standards). $^1$H NMR (D$_2$O): δ 8.25-δ 5.50 (broad, 4H, aromatic), δ 4.50-δ 3.50 (broad, 1.44H, benzylic), δ 2.75-δ 0.25 (broad, backbone CH CH$_2$, C—CH$_3$).

Example 24

Poly(NaVBS-co-2-VPE)

A 250 ml round-bottom flask was charged with 13.20 g NaVBS (60.0 mmol), 4.44 g 2-VPE (30.0 mmol), 54.0 mg Vazo 56WSP (0.2 mmol) 133 mL water, and a stir bar. The mixture was sparged with nitrogen for 15 min., then closed with rubber septa and put into an oil bath at 80° C. with vigorous stirring for 24 h. The reaction mixture was then slowly precipitated into 500 ml of acetone with vigorous stirring. The white precipitate was filtered, washed with acetone, and dried in vacuo. (16.0 g, 91%, Mw=47.6 k, PDI=2.1 vs. sulfonated polystyrene narrow standards). $^1$H NMR (D$_2$O): δ 8.25-δ 5.50 (broad, 4H, aromatic), δ 4.60-δ 3.20 (broad, 2H, benzylic and CH$_2$—O), δ 3.20-δ 2.30 (broad, benzylic CH$_2$—C), δ 2.30-d 0.25 (broad, backbone CH$_2$ and CH).

Example 25

Poly(NaSS-co-VBA)

A 500 ml round-bottom flask was charged with 27.9 g NaSS (135.3 mmol), 8.1 g VBA (60.2 mmol), 109 mg Vazo 56WSP (0.4 mmol) 396 mL water, and a stir bar. The mixture was sparged with nitrogen for 15 min., then closed with rubber septa and heated at 80° C. with vigorous stirring for 24 h. The reaction mixture was then slowly precipitated into 500 ml of acetone with vigorous stirring. The white precipitate was filtered, washed with acetone, and dried in vacuo. (22 g, 64 mol-% of sulfonated monomer, Mw=237 k, PDI=2.6 vs. sulfonated polystyrene narrow standards). $^1$H NMR (D$_2$O): δ 7.84-δ 5.85 (broad, aromatic), δ 4.60-δ 4.06 (broad, 2H, benzylic CH$_2$—O), δ 2.50-δ 0.50 (broad, backbone CH$_2$ and CH).

Example 26

Poly(NaSS-co-HEMA)

A 500 ml round-bottom flask was charged with 27.9 g NaSS (135.3 mmol), 8.1 g HEMA (60.2 mmol), 109 mg Vazo 56WSP (0.4 mmol) 396 mL water, and a stir bar. The mixture was sparged with nitrogen for 15 min., then closed with rubber septa and heated at 80° C. with vigorous stirring for 24 h. The reaction mixture was then slowly precipitated into 500 ml of acetone with vigorous stirring. The white precipitate was filtered, washed with acetone, and dried in vacuo. (39.4 g, 64 mol-% of sulfonated monomer %, Mw=457 k, PDI=3.7 vs. sulfonated polystyrene narrow standards). $^1$H NMR (D$_2$O): δ 7.90-δ 5.95 (broad, aromatic), δ 3.72-δ 2.86 (broad, 4H, O—CH$_2$—CH$_2$—OH), δ 2.13-δ 0.05 (broad, backbone CH$_3$, CH$_2$ and CH).

Example 27

Poly(NaSS)

A 500 ml round-bottom flask was charged with 13.8 g NaSS (66.9 mmol), 109 mg Vazo 56WSP (0.4 mmol) 196 mL water, and a stir bar. The mixture was sparged with nitrogen for 15 min., then closed with rubber septa and heated at 80° C. with vigorous stirring for 24 h. The reaction mixture was then slowly precipitated into 500 ml of acetone with vigorous stirring. The white precipitate was filtered, washed with acetone, and dried in vacuo. (10 g, Mw=490 k, PDI=3.6 vs. sulfonated polystyrene narrow standards). $^1$H NMR (D$_2$O): δ 7.94-δ 5.94 (broad, aromatic), δ 2.10-δ 0.22 (broad, backbone CH2 and CH).

Example 28

Poly(2-acrylamido-2-methylpropane sulfonic acid) (p(AMPS))

A 1000 ml cylindrical reactor was equipped with reflux condensor, mechanical stirrer and charged with 50.0 mL of deionized water and heated to 75° C. 151.6 g AMPS, 545.2 mL water, were stirred together in a separate vessel until the AMPS was fully dissolved. The reactor and AMPS solution were sparged with nitrogen for 15 min. 446 mg Vazo 56WSP was separately dissolved in 9.47 g of water. The AMPS and Vazo 56WSP solutions were fed slowly into the reactor over a period of 1 h maintaining the reaction temperature at 75° C. with vigorous stirring. The reaction was stirred at 75° C. for and additional 2 h. The final reaction mixture was cooled to room temperature. The mixture was observed to be extremely viscous, indicating the presence of high molecular weight polymer.

(Co)Polymer Syntheses (Post-Polymerization Modifications)

Example 29

Sulfoethylated p(VBC)

1.0 g of poly(vinylbenzyl chloride) (p(VBC)) was dissolved in 99.0 g of anhydrous dimethylsulfoxide (DMSO) in a 250 mL round-bottom flask equipped with an addition funnel and magnetic stirring under nitrogen. Separately, 1.068 g (1.1 eq. to Cl) of sodium isethionate (NaISA) was dissolved in 19.0 g DMSO under nitrogen. In a third vessel, 0.165 g (1.05 eq. to Cl) of sodium hydride (NaH) was added to 3.1 g DMSO under nitrogen and stirred to form a slurry. The NaH slurry was then added to a 250 mL round-bottom flask under nitrogen purge and magnetic stirring. The NaISA solution was then added slowly with rapid stirring. The NaH/NaISA mixture (disodium isethionate) was stirred at room temperature for 30 min. until the evolution of gas has ceased. This mixture was then quickly transferred to the addition funnel of the p(VBC) reactor. The disodium isethionate solution was then slowly added to the p(VBC) solution with rapid stirring. This mixture was stirred for an additional 18 h at room temperature. After that time, 1.0 mL of 5.0 v/v % aqueous hydrochloric acid was added. The solution was then slowly poured into 1 L of tetrahydrofuran with rapid stirring forming a white precipitate. The precipitate was filtered, redissolved in 100 mL of deionized water and slowly poured into 800 mL of tetrahydrofuran. The white polymer powder was collected by filtration and dried in vacuo. $^1$H NMR (D$_2$O): δ 7.40-δ 5.75 (broad, 4H, aromatic), δ 4.60-δ 4.00 (broad, 2H, benzylic), δ 4.00-δ 3.30 (broad, 2H, ethyl —CH$_2$—SO$_3$), δ 3.25-δ 2.80 (broad, 2H, ethyl —O—CH$_2$—C), δ 2.25-δ 0.75 (broad, 3H, backbone CH2, CH).

Example 30

Sulfopropylated p(VBC)

1.0 g of poly(vinylbenzyl chloride) (p(VBC)) was dissolved in 99.0 g of anhydrous dimethylsulfoxide (DMSO) in a 250 mL round-bottom flask equipped with an addition funnel and magnetic stirring under nitrogen. Separately, 2.13 g (2.0 eq. to Cl) of sodium 3-hydroxypropane sulfonate (NaHPS) was dissolved in 42.5 g anhydrous DMSO under nitrogen. In a third vessel, 0.3464 g (2.2 eq. to Cl) of sodium hydride (NaH) was added to 5.0 g DMSO under nitrogen and stirred to form a slurry. The NaH slurry was then added to a 250 mL round-bottom flask under nitrogen purge and magnetic stirring. The NaHPS solution was then added slowly with rapid stirring. The NaH/NaHPS mixture (disodium hydroxypropanesulfonate) was stirred at room temperature for 30 min. until the evolution of gas had ceased. This mixture was then quickly transferred to the addition funnel of the p(VBC) reactor. The disodium hydroxypropandsulfonate solution was then slowly added to the p(VBC) solution with rapid stirring. This mixture was stirred for an additional 18 h at room temperature. After that time, 1.0 mL of 5.0 v/v % aqueous hydrochloric acid was added. The solution was then slowly poured into 1 L of acetone with rapid stirring forming a white precipitate. The precipitate was filtered, redissolved in 100 mL of deionized water and slowly poured into 800 mL of acetone. The white polymer powder was collected by filtration and dried in vacuo. $^1$H NMR (D$_2$O): δ 7.40-δ 5.75 (broad, 4H, aromatic), δ 4.60-δ 4.20 (broad, 2H, benzylic), δ 4.20-δ 3.50 (broad, 2H, propyl-O—CH$_2$—), δ 3.10-δ 2.60 (broad, 2H, propyl —CH$_2$—SO$_3$), δ 2.25-δ 1.75 (broad, 2H, propyl-C—CH$_2$—C), δ 1.50-δ 0.50 (broad, 3H, backbone CH—CH$_2$).

Example 31

Conversion of p(tBuOS) to poly(vinylphenol)

2.0 g of p(t-BuOS) (Mw~1200 k, PDI=10.0) was dissolved in 62.0 g of 1,4-dioxane in a 250 mL round bottom flask. To that solution was added 17.9 g of concentrated hydrochloric acid (37.0 wt.-% in water). The mixture was stirred at 80° C. under nitrogen for 4 h. The reaction solution was then poured into 400 mL of water. This slurry was neutralized to pH=7 by addition of a 5.0 wt.-% aqueous sodium hydroxide solution. The polymer powder was filtered and dried in vacuo. (1.30 g, 95%, Mw=600 k, PDI=8.0 vs. poly(acrylic acid) narrow standards). $^1$H NMR (DMSO-d6): δ 9.10-δ 8.80 (broad, 1H, OH), δ 6.75-δ 6.20 (broad, 4H, aromatic), δ 2.20-δ 0.90 (broad, backbone CH, CH$_2$).

Example 32

Conversion of p(acetoxystyrene to poly(vinylphenol)

1.0 g of poly(acetoxystyrene) (6.16 mmol acetoxy groups) was dissolved in 37.7 mL of 1,4-dioxane at room temperature. To this rapidly stirred solution was added a solution of 2.47 g of sodium hydroxide (61.7 mmol) in 19.3 mL of deionized water. The reaction mixture was then heated to 40° C. for 4 h. The resulting mixture was cooled to room temperature and acidified with and excess of 5.0 v/v % aqueous hydrochloric acid. The precipitated polymer was washed with deionized water several times and dried in vacuo. (0.73 g, 98%, Mw=630 k, PDI=5.0 vs. poly(acrylic acid) narrow standards). $^1$H NMR (DMSO-d6): δ 9.10-δ 8.80 (broad, 1H, OH), δ 6.75-δ 6.20 (broad, 4H, aromatic), δ 2.20-δ 0.90 (broad, backbone CH, CH$_2$).

Example 33

Sulfopropylation of poly(vinylphenol) (pVPh)

1.0 g of pVPh (Mw~600 k, PDI~4.0) was dissolved in 19.0 g of anhydrous dimethylsulfoxide (DMSO) in a 100 mL round-bottom flask equipped with an addition funnel and magnetic stirring under nitrogen. Separately, 1.88 g (1.0 eq. to OH) of sodium 3-bromopropane sulfonate (NaBPS) was dissolved in 5.64 g anhydrous DMSO under nitrogen. In a third vessel, 0.220 g (1.1 eq. to OH) of sodium hydride (NaH) was added to 5.0 g DMSO under nitrogen and stirred to form a slurry. The NaH slurry was then added to a 250 mL round-bottom flask under nitrogen purge and magnetic stirring. The pVPh solution was then added slowly with rapid stirring. The NaH/pVPh mixture (poly(sodium vinylphenolate)) was stirred at room temperature for 30 min. until the evolution of gas had ceased. The NaBPS solution was then quickly added and stirred at room temperature for 18 h. The solution was then slowly poured into 500 mL of acetone with rapid stirring forming a white precipitate. The white polymer powder was collected by filtration and dried in vacuo. (2.0 g, 91%), $^1$H NMR (D$_2$O): δ 7.10-δ 5.90 (broad, 4H, aromatic), δ 4.10-δ 3.80 (broad, 2H, propyl-- —O—CH$_2$—), δ 2.90-δ 2.50 (broad, 2H, propyl —CH$_2$—SO$_3$), δ 2.20-δ 1.80 (broad, 2H, propyl-C—CH$_2$—C), δ 2.00-δ 0.50 (broad, 3H, backbone CH—CH$_2$).

Ion-Exchange of Salt-Form (Co)Polymers to Protonated (Co)Polymers

General procedure for many types of water-soluble, acidic polymers in salt-form

Example 34

Small-Scale Ion-Exchange

To a glass column (7.5 cm in diameter, 24 cm in length) was added Dowex® Marathon C ion-exchange resin (approx. 300 g). This column was rinsed exhaustively with deionized water then charged with a 10 wt. % solution of poly(sodium vinylbenzylsulfonate-co-vinylbenzyl alcohol) (47.49 g) in deionized water (191.2 g). The eluent was collected in fractions, which were tested with pH strips in order to determine presence of protonated polymer. Fractions containing polymer were combined to yield a 3% solution of poly(vinylbenzylsulfonic acid-co-vinylbenzyl alcohol) (38.6 g, 90%), 99+% exchange efficiency ($H^+$ for $Na^+$) by elemental analysis and acid-base titration with NaOH to phenolphthalein endpoint.

Example 35

Large-scale Ion-exchange

A glass column (30.5 cm in diameter, 122 cm in length) was equipped with a compressed nitrogen line (25 psi max. pressure) and deionized water inlet. Dowex® Marathon C ion-exchange resin (21.74 L, wet) was then added. This column was rinsed exhaustively with deionized water then charged with a 20 wt. % solution of poly(sodium vinylbenzylsulfonate-co-vinylbenzyl alcohol) (3970 g) in deionized water (14.0 kg). The solution was forced through the column with nitrogen overpressure (up to 17 psig) at a rate of 0.4 bed volumes per hour and eluent was collected in fractions. The pH of the eluent was continuously tested with pH test strips in order to determine the presence of protonated polymer. Fractions containing the highest concentrations of polymer were combined to yield a 17.5 wt. % solution of poly(vinylbenzylsulfonic acid-co-vinylbenzyl alcohol) (2540 g, 69%) with 99.8% exchange efficiency ($H^+$ for $Na^+$) by elemental analysis and acid-base titration with NaOH to phenolphthalein endpoint.

TAAOH Neutralization of Protonated Polyelectrolyte Solutions

Example 36

Tetrabutylammonium hydroxide neutralization of Poly(Styrenesulfonic acid)

15.00 g of a 30 wt. % poly(styrenesulfonic acid) (purchased from Polyscience, MW=70 kg/mol) aqueous solution was combined with 9.22 g of 55 wt. % tetrabutylammonium hydroxide (TBAOH) aqueous solution and allowed to stir at room temperature for 60 minutes. 15.03 g of NMP was then added to the neutralized polyelectrolyte solution. The neutralized polyelectrolyte solution was then heated to 60° C. in vacuo to remove the water. This resulted in a 38 wt. % solution of TBAOH-neutralized poly(styrenesulfonate) in NMP with residual water content of no more than 0.2 wt. %.

Example 37

Tetrabutylammonium hydroxide neutralization of Poly(Styrenesulfonate-co-vinylbenzyl alcohol)

153.94 g of a 2.6 wt. % poly(styrenesulfonic acid-co-vinylbenzyl alcohol) (MW=237 kg/mol, 70 wt. % styrene sulfonic acid) aqueous solution was combined with 6.79 g of 55 wt. % TBAOH aqueous solution and allowed to stir at room temperature for at least 60 minutes. 30.0 g of NMP was then added to the neutralized polyelectrolyte solution. The neutralized polyelectrolyte solution was then heated to 60° C. in vacuo to remove the water. This resulted in a 20 wt. % solution of TBAOH-neutralized poly(styrenesulfonate-co-vinyl benzyl alcohol) in NMP with residual water content of no more than 0.7 wt. %.

Example 38

Tetrabutylammonium hydroxide neutralization of Poly(Vinylbenzyl sulfonic acid-co-hydroxyethyl methacrylate)

7.03 g of a 12.2 wt. % poly(vinylbenzylsulfonic acid-co-hydroxyethyl methacrylate) (MW 190 kg/mol, 79 wt. % VBS) aqueous solution was combined with 1.56 g of 55 wt. % TBAOH aqueous solution and allowed to stir at room temperature for at least 60 minutes. 6.91 g of NMP was then added to the neutralized polyelectrolyte solution. The neutralized polyelectrolyte solution was then heated to 60° C. in vacuo to remove the water. This resulted in a 27 wt. % solution of TBAOH-neutralized poly(VBS-co-hydroxyethyl methacrylate) in NMP.

Example 39

TPAOH neutralization of Poly(Vinylbenzyl sulfonic acid-co-vinylbenzyl alcohol)

24.02 g of a 16.8 wt. % poly(VBS-co-vinylbenzyl alcohol) (MW=60 kg/mol, 86 wt. % VBS) aqueous solution was combined with 8.31 g of 40.9 wt. % tetrapropylammonium hydroxide (TPAOH) aqueous solution and allowed to stir at room temperature for at least 60 minutes. 29.74 g of NMP was then added to the neutralized polyelectrolyte solution. The neutralized polyelectrolyte solution was then heated to 60° C. in vacuo to remove the water. This resulted in a 20 wt. % solution of TPAOH-neutralized poly(VBS-co-vinyl benzyl alcohol) in NMP.

Example 40

TBAOH neutralization of Poly(Vinylbenzyl sulfonic acid-co-vinylbenzyl alcohol)

72.31 g of a 13.9 wt. % poly(vinylbenzyl sulfonic acid-co-vinylbenzyl alcohol) (MW=260 kg/mol, 85 wt. % VBS) aqueous solution was combined with 19.26 g of 55 wt. % TBAOH aqueous solution and allowed to stir at room temperature for at least 60 minutes. 79.36 g of NMP and 143.86 g of acetonitrile was then added to the neutralized polyelectrolyte solution. The neutralized polyelectrolyte solution was then heated to 60° C. in vacuo to remove the water by azeotropic distillation. This resulted in a 20 wt. % solution of TBAOH-neutralized poly(vinylbenzyl sulfonate-co-vinyl benzyl alcohol) in NMP with residual water content of no more than 0.09 wt. %.

Example 41

TBAOH neutralization of Poly(2-acrylamido-2-methylpropane sulfonate)

17.25 g of 20.1 wt. % poly(2-acrylamido-2-methylpropane sulfonate) aqueous solution (MW=120 kg/mol) was combined with 6.35 g of 55% TBAOH aqueous solution and allowed to stir at room temperature for at least 60 minutes. 15.35 g of NMP was then added to the neutralized polyelectrolyte solution. The neutralized polyelectrolyte solution was then is heated to 60° C. in vacuo to remove the water. This resulted in a 35 wt. % solution of TBAOH-neutralized poly (2-acrylamido-2-methylpropane sulfonate) in NMP.

Example 42

TBAOH neutralization of Poly(acrylic acid)

A poly(acrylic acid) acid solution was prepared by dissolving 4.98 g of poly(acrylic acid) (MW=450 kg/mol) into 81.40 g of NMP. The poly(acrylic acid) was purchased from Sigma-Aldrich as used as received. 7.58 g of the poly(acrylic acid) solution was combined with 0.649 g of 55 wt. % TBAOH aqueous solution and allowed to stir at room temperature for at least 60 minutes.

Example 43

TBAOH Neutralization of spPVA 15.7 g of a 10.9 wt. % aqueous solution sulfopropylated PVA (MW=144 kg/mol, 56 mole % sulfonation) was combined with 3.84 g of 55% TBAOH aqueous solution in a vial and allowed to stir at room temperature for at least 60 minutes. 8.04 g of NMP was then added to the neutralized polyelectrolyte solution. The neutralized polyelectrolyte solution was then heated to 60° C. in vacuo to remove the water. This resulted in a 31 wt. % solution of TBAOH-neutralized sulfopropylated poly(vinyl alchohol) in NMP with residual water content of no more than 0.2 wt. %.

Blending of Neutralized Polyelectrolyte Solutions with Matrix Copolymers

Example 44

TBAOH neutralized Poly(Styrenesulfonate) with Kynar® PVDF 24.36 g of a solution containing Kynar® PVDF 2801 and NMP (15 wt. % PVDF) was combined with 10.08 g of 38 wt. % TBAOH-neutralized poly(styrenesulfonate) from Example 36 and stirred at room temperature for four hours before membrane casting.

Example 45

TBAOH neutralized Poly(Styrenesulfonate) with Kynar® PVDF 18.99 g of a solution containing Kynar® PVDF 2801 and NMP (15 wt. % PVDF) was combined with 14.17 g of 20 wt. % TBAOH-neutralized poly(styrenesulfonate-co-vinylbenzyl alcohol) from Example 37 and stirred at room temperature for four hours. To this solution was added 0.9973 g of Desmodur N 3300A cross-linking agent (aliphatic polyisocyanate from Bayer) and stirred for 2 hours at room temperature before membrane casting.

Example 46

TBAOH neutralized Poly(VBS-co-hydroxylethyl methacrylate) with Kynar® PVDF 10.73 g of a solution containing Kynar® PVDF 2801 and NMP (15 wt. % PVDF) was combined with 6.16 g of 27 wt. % TBAOH-neutralized poly(styrenesulfonate-co-vinylbenzyl alcohol) from Example 38 and stirred at room temperature for four hours. To this solution was added 0.7135 g of Desmodur BL 3175A cross-linking agent (blocked aliphatic polyisocyanate from Bayer) and 0.030 g of Fascat 4202 (dibutyltin dilaurate from Arkema Inc.). The solution was stirred for 2 hours at room temperature before membrane casting.

Example 47

TPAOH neutralized Poly(VBS-co-VBA) with Kynar® PVDF 13.69 g of a solution containing Kynar® PVDF 2801 and NMP (15 wt. % PVDF) was combined with 8.03 g of 20 wt. % TPAOH-neutralized poly(styrenesulfonate-co-vinylbenzyl alcohol) From Example 39 and stirred at room temperature for four hours. To this solution was added 0.85 g of Desmodur BL 3175A cross-linking agent and 0.026 g of Fascat 4202. The solution was then stirred for 2 hours at room temperature before membrane casting.

Example 48

TBAOH neutralized Poly(VBS-co-VBA) with Kynar® PVDF 12.96 g of a solution containing Kynar® PVDF 2801 and NMP (15 wt. % PVDF) was combined with 11.12 g of 20 wt. % TBAOH-neutralized poly(styrenesulfonate-co-vinylbenzyl alcohol) from Example 40 and stirred at room temperature for four hours. To this solution was added 0.3420 g of Desmodur N 3300A cross-linking agent. The solution was stirred for 2 hours at room temperature before membrane casting.

Example 49

TBAOH neutralized Poly(2-acrylamido-2-methylpropane sulfonate) with Kynar® PVDF 43.06 g of a solution containing Kynar® PVDF 2801 and NMP (15 wt. % PVDF) was combined with 19.3 g of 35 wt. % TBAOH-neutralized poly(2-acrylamido-2-methylpropane sulfonate) from Example 41 and stirred at room temperature for four hours before membrane casting.

Example 50

TPAOH neutralized Poly(acrylic acid) with Kynar® PVDF 5.30 g of a solution containing Kynar® 2801 and NMP (15 wt. % polymer) was then blended with 8.23 g of neutralized poly(acrylic acid) solution from Example 42 for four hours at room temperature before membrane casting.

Example 51

TBAOH neutralized spPVA with Kynar® PVDF 4.72 g of a solution containing Kynar® PVDF 2801 and NMP (15 wt. % PVDF) was combined with 5.5 g of 31 wt. % TBAOH-neutralized sulfopropylated poly(vinyl alcohol) from Example 43 and stirred at room temperature for four hours. To this solution was added 0.290 g of Desmodur N 3300A cross-linking agent. The solution was stirred for 2 hours at room temperature before membrane casting.

Drying of Polymer Blend Solutions

Example 52

Casting of the polymer blend solutions into membranes described in Examples 44-51 was done using a Mathis LTE Labdryer. Aluminum foil with approximate dimensions of 15×12 in$^2$ was used as the substrate for casting. Approximately 15 g of polymer solution was spread onto the foil and drawn down to a wet film thickness of about 300 μm using a doctor blade. The resulting thin films was then heated at 177° C. for 7 min with an air flow of 1800-2300 RPM. The dry membranes were then removed from the oven and cooled to room temperature. All polymer blend solution compositions produced membranes that had a dry film thickness between 25-50 μm.

Washing and Acidification of Polyelectrolyte/Matrix (Co) Polymer Blend Films

Example 53

The membranes cast on aluminum foil in Example 52 were immersed in 18 MΩ deionized water to release them from the substrate. The free-standing membranes were then immersed in a 1M aqueous hydrochloric acid bath at 60-65° C. for 120 min. Subsequently, they were washed with deionized water and immersed in a 1M aqueous sulfuric acid at 60-65° C. for 120 min. The membranes were then removed from the sulfuric acid bath and washed with 18 MΩ deionized water to remove residual acid. The acid-form membranes were then air dried and stored at room temperature for future use.

Preparation of Membrane-Electrode Assemblies

General procedure for the preparation of membrane-Electrode Assemblies (MEAs) from many types of polyelectrolyte/matrix (co)polymer blend films produced by the methodologies discussed above Example 54

Commercially-available electrodes and gaskets are cut to appropriate size/shape to fit in the testing cell. There should be no gaps and/or overlap of electrodes and gaskets. One electrode and gasket each are placed onto a stainless steel hot-pressing plate/insert. The surface of the electrode is then wetted with deionized water A piece of wet membrane is then placed over the electrode surface and smoothed out. A layer of deionized water down is then applied to the upper membrane surface and the second electrode is placed on this layer. The electrodes are aligned and excess water gently squeezed out. The second gasket is placed on top of the MEA, followed by insert and top pressing plate. The entire assembly is then placed into a pre-heated press at a predetermined time and temperature. It is then removed and cooled to room temperature under low pressure (1-2 lbs.). The MEA is carefully removed from the stainless steel pressing plates (the membrane may stick to the insert slightly) and excess membrane/gasket material is trimmed away. The complete MEA is placed in the testing cell and bolts are tightened with an appropriate, predetermined force.

What is claimed is:

1. A polymer blend composition having no readily hydrolysable groups comprising:

a) a polyelectrolyte copolymer having the general formula:

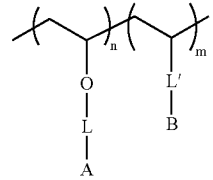

wherein:
n=greater than or equal to 1 percent
m=less than or equal to 99 percent
L=non-perfluorinated alkyl or alkylene-ether linkage
L'=a bond or alkyl or alkylene-ether linkage
A=a sulfonate, phosphonate or carboxylate
B=a group capable of cross-linking, selected from the group consisting of hydroxyl; primary, secondary, and tertiary amines: N-methylol acrylamide; isobutoxy methacrylamide; N-methylenebisacrylamide; allyl groups; styryl groups; glycidyl methacrylate; free and blocked isocyanates, melamines, epoxies, carboxylates, α,ω-dihaloalkanes, α,ω-dialdehydes, carboxylic acids, alkoxy silanes, silicones, aziridines, and carbodiimides; and b) a matrix polymer.

2. The polymer blend of claim 1 wherein n is greater than 70% and m is less than 30%.

3. The polymer blend of claim 1 wherein said matrix polymer comprises a fluoropolymer.

4. The polymer blend of claim 1 wherein the polyelectrolyte copolymer is present in domain sizes of less than 500 nm.

5. The polymer blend of claim 4 wherein said polyelectrolyte domain sizes are from 1 nm to 100 nm.

6. The polymer blend of claim 1 wherein said group capable of crosslinking (B) is a hydroxyl group.

7. The polymer blend of claim 1 wherein said group (A) is a sulfonate group.

8. The polymer blend of claim 1 wherein said polyelectrolyte copolymer (a) is an tetraalkylammonium salt.

9. The polymer blend of claim 1, wherein said polyelectrolyte copolymer contains as the monomer units at over 1 mole % a vinyl ether functionalized with a $C_{2-6}$ alkyl sulfonate, alkyl phosphonate or alkyl carboxylate.

10. The polymer blend of claim 9, wherein said polyelectrolyte copolymer contains as the monomer units at over 1 mole % a vinyl ether functionalized with a $C_{3-4}$ alkyl sulfonate, alkyl phosphonate or alkyl carboxylate.

11. The polymer blend of any of claim 1, wherein said polyelectrolyte copolymer contains as the monomer units at over 1 mole % a poly(vinyl alcohol) alcohol functionalized with a $C_{2-6}$ alkyl sulfonate, alkyl phosphonate or alkyl carboxylate.

* * * * *